United States Patent
Qi et al.

(10) Patent No.: US 12,099,240 B2
(45) Date of Patent: Sep. 24, 2024

(54) SPLITTER, OPTICAL DISTRIBUTION NETWORK, AND METHOD FOR DETERMINING WAVELENGTH CORRESPONDING TO OPTICAL FILTER STRUCTURE

(71) Applicant: Huawei Technologies Co., Ltd., Shenzhen (CN)

(72) Inventors: Biao Qi, Wuhan (CN); Qi Zhang, Dongguan (CN); Zhenhua Dong, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 92 days.

(21) Appl. No.: 18/147,378

(22) Filed: Dec. 28, 2022

(65) Prior Publication Data

US 2023/0152523 A1    May 18, 2023

Related U.S. Application Data

(63) Continuation of application No. PCT/CN2021/082841, filed on Mar. 24, 2021.

(30) Foreign Application Priority Data

Jun. 30, 2020    (CN) .......................... 202010621400.X

(51) Int. Cl.
G02B 6/293    (2006.01)
H04B 10/071   (2013.01)
H04Q 11/00    (2006.01)

(52) U.S. Cl.
CPC ..... *G02B 6/29325* (2013.01); *G02B 6/29395* (2013.01); *H04B 10/071* (2013.01); *H04Q 11/0067* (2013.01)

(58) Field of Classification Search
CPC    G02B 6/125; G02B 6/29325; G02B 6/29395; G02B 6/293; G02B 6/29368;
(Continued)

(56) References Cited

U.S. PATENT DOCUMENTS 5,652,814 A * 7/1997 Pan .................. G02B 6/2937
                                                     385/24
6,738,536 B2 * 5/2004 Boettcher ........... G02B 6/2932
                                                     398/87

(Continued)

*Primary Examiner* — Hibret A Woldekidan
(74) *Attorney, Agent, or Firm* — Slater Matsil, LLP

(57) ABSTRACT

A splitter includes an optical input section, N optical branch sections, and at least (N−1) optical filter structures. Each optical filter structure reflects an optical signal of one wavelength. The at least (N−1) optical filter structures include a special optical filter structure and at least (N−3) common optical filter structures, and a wavelength of an optical signal reflected by each of the common optical filter structures is a common wavelength. A wavelength of an optical signal reflected by a first/second special optical filter structure is a first/second special wavelength. At least (N−3) common wavelengths constitute an arithmetic sequence, a difference between the first special wavelength and a largest common wavelength is greater than a tolerance of the arithmetic sequence, and a difference between the second special wavelength and a smallest common wavelength is greater than the tolerance of the arithmetic sequence.

20 Claims, 10 Drawing Sheets

(58) Field of Classification Search
CPC ............ G02B 6/29362; G02B 6/29365; G02B 6/29364; G02B 6/29367; G02B 6/34; G02B 6/2932; G02B 6/29322; G02B 6/29323; H04B 10/071; H04Q 11/0067; H04J 14/02; H04J 14/0205; H04J 14/0208; H04J 14/0209; H04J 14/08
See application file for complete search history.

(56) References Cited

U.S. PATENT DOCUMENTS

2014/0348466 A1* 11/2014 Qi .......................... G02B 6/125
385/37
2020/0124498 A1* 4/2020 Leclerc ................ G01M 11/333

* cited by examiner

SPLITTER, OPTICAL DISTRIBUTION NETWORK, AND METHOD FOR DETERMINING WAVELENGTH CORRESPONDING TO OPTICAL FILTER STRUCTURE

CROSS-REFERENCE TO RELATED APPLICATIONS

This application is a continuation of International Application No. PCT/CN2021/082841, filed on Mar. 24, 2021, which claims priority to Chinese Patent Application No. 202010621400.X, filed on Jun. 30, 2020. The disclosures of the aforementioned applications are hereby incorporated by reference in their entireties.

TECHNICAL FIELD

Embodiments of the present invention relate to the field of optical communications technologies, and in particular, to a splitter, an optical distribution network, and a method for determining a wavelength corresponding to an optical filter structure.

BACKGROUND

As a fiber network scale rapidly expands, a passive optical network technology gradually becomes a hotspot of an optical access network technology. To ensure communication and improve availability of a fiber network, a running status of a fiber link needs to be learned in a timely manner, and a deterioration trend needs to be found in a timely manner to prevent a failure. In addition, when a breakpoint occurs on the fiber link, a quick response can be made, and positioning can be accurately performed to shorten an obstacle search time.

In the conventional technology, gratings of different characteristic wavelengths are separately disposed on different ports of a splitter. When a wavelength-tunable optical time domain reflectometer (OTDR) emits probe light of a wavelength, the probe light of the wavelength is reflected or projected by a grating of a port of the corresponding wavelength, and returned light is detected and identified by the OTDR, so that the port of the splitter is remotely identified. Generally, a temperature at which the splitter can operate ranges from −40° C. to 85° C. However, because the grating is susceptible to a temperature change, a center wavelength corresponding to the grating of the splitter may drift by ±1 nm. Therefore, to distinguish between different ports corresponding to different wavelengths, a difference of at least 2 nm needs to be retained between different center wavelengths configured on different ports of the splitter. However, an available wavelength range that can be used by the OTDR is limited. For example: The available wavelength range is from 1600 nm to 1620 nm. Therefore, FBGs of a maximum of 10 different wavelengths can be configured on the splitter. As a result, a splitter with more than 10 ports cannot be used, causing a barrier to popularization of this technology.

SUMMARY

Embodiments of the present invention provide a splitter, an optical distribution network, and a method for determining a wavelength corresponding to an optical filter structure, to resolve a problem of excessive wavelengths occupied for disposing gratings on ports of the splitter.

According to a first aspect, a splitter is provided. The splitter includes an optical input section, N optical branch sections, and at least (N−1) optical filter structures. Each optical filter structure reflects an optical signal of one wavelength, where N is an integer greater than or equal to 4, the at least (N−1) optical filter structures include a special optical filter structure and at least (N−3) common optical filter structures, the at least (N−3) common optical filter structures are disposed on at least (N−3) optical branch sections in a one-to-one correspondence, and a wavelength of an optical signal reflected by each of the at least (N−3) common optical filter structures is a common wavelength. The special optical filter structure includes at least one of a first special optical filter structure and a second special optical filter structure, a wavelength of an optical signal reflected by the first special optical filter structure is a first special wavelength, and a wavelength of an optical signal reflected by the second special optical filter structure is a second special wavelength. At least (N−3) common wavelengths constitute an arithmetic sequence, a difference between the first special wavelength and a largest common wavelength is greater than a tolerance of the arithmetic sequence, and a difference between the second special wavelength and a smallest common wavelength is greater than the tolerance of the arithmetic sequence. Because two types of wavelengths, namely, a common-difference wavelength and a special wavelength, are set, when test light is sent on a network side to detect an optical link on which a terminal is located, types of the test light can be greatly reduced, wavelength resources can be reduced, a wavelength scanning range of the test light on the network side can be reduced, a production difficulty and costs of a component for sending the test light on the network side can be reduced, and implementation is easy.

With reference to the first aspect and the first possible implementation, in a second possible implementation, when the splitter includes the first special optical filter structure and the second special optical filter structure, both the first special optical filter structure and the second special optical filter structure are disposed on the optical input section, where a quantity of the at least (N−3) optical branch sections is (N−1) or N; or the first special optical filter structure and the second special optical filter structure are disposed on two optical branch sections, where the two optical branch sections do not belong to the at least (N−3) optical branch sections, and a quantity of the at least (N−3) optical branch sections is (N−3) or (N−2); or one of the first special optical filter structure and the second special optical filter structure is disposed on the optical input section, and the other one of the first special optical filter structure and the second special optical filter structure is disposed on one optical branch section, where the one optical branch section does not belong to the at least (N−3) optical branch sections, and a quantity of the at least (N−3) optical branch sections is (N−2) or (N−1).

With reference to the first aspect and the first possible implementation, in a third possible implementation, when the splitter includes only the first special optical filter structure or only the second special optical filter structure, the first special optical filter structure or the second special optical filter structure is disposed on the optical input section, where a quantity of the at least (N−3) optical branch sections is (N−1) or N; or the first special optical filter structure or the second special optical filter structure is disposed on one optical branch section, where the one optical branch section does not belong to the at least (N−3)

optical branch sections, and a quantity of the at least (N−3) optical branch sections is (N−2) or (N−1).

With reference to any one of the first aspect and the foregoing possible implementations, in a fourth possible implementation, the splitter is an even splitter or an uneven splitter. When the splitter is an uneven splitter, the uneven splitter further includes one bypass optical output section, an optical filter structure disposed on the bypass optical output section reflects an optical signal of one bypass wavelength at a specific reflectivity, and the bypass wavelength is different from any one of the common wavelength, the first special wavelength, and the second special wavelength.

With reference to any one of the first aspect and the foregoing possible implementations, in a fifth possible implementation, the splitter is a planar lightwave circuit PLC splitter, and the PLC splitter includes an optical input fiber, N optical output fibers, and a planar lightwave circuit. The planar lightwave circuit includes an optical input waveguide, N optical output waveguide, and an intermediate branch waveguide connected between the optical input waveguide and the N optical output waveguide. The optical input fiber is connected to the optical input waveguide, and the optical input section includes the optical input fiber and the optical input waveguide. The N optical output fibers are connected to the N optical output waveguide in a one-to-one correspondence. Each of the optical branch sections includes the intermediate branch waveguide and a pair including one optical output waveguide and one optical output fiber that are connected to each other.

With reference to any one of the first aspect and the foregoing possible implementations, in a sixth possible implementation, the optical filter structure is disposed on at least one of the intermediate branch waveguide, the optical output waveguide, and the optical output fiber. The optical output fiber includes a ribbon fiber, and the optical filter structure is disposed on the ribbon fiber.

With reference to the foregoing possible implementations of the first aspect, in a seventh possible implementation, the splitter is a fused biconical taper splitter, the fused biconical taper splitter includes an optical input fiber, a coupling area fiber, and N optical output fibers, and the optical filter structure is disposed on the optical output fiber. It is easier to produce the optical filter structure, and the production is simple, for example, gratings may be etched together, so that costs are reduced.

With reference to any one of the first aspect and the foregoing possible implementations, in an eighth possible implementation, the splitter further includes a temperature drift consistency package. The temperature drift consistency package is configured to: when an ambient temperature changes, make a temperature inside the temperature drift consistency package be uniformly distributed. The at least (N−1) optical filter structures are packaged and fastened inside the temperature drift consistency package, or the at least (N−3) common optical filter structures are packaged and fastened inside the temperature drift consistency package.

With reference to any one of the first aspect and the foregoing possible implementations, in a ninth possible implementation, the optical filter structure is specifically a Bragg grating, a long-period fiber grating, or a filter coating.

According to a second aspect, a splitter is provided. The splitter includes an optical input section, N optical branch sections, and at least (N−1) optical filter structures. Each optical filter structure reflects an optical signal of one wavelength. The optical filter structure includes a special optical filter structure and at least (N−3) common optical filter structures, and in the at least (N−3) common optical filter structures, at least two common optical filter structures reflect optical signals of a same wavelength but have different reflectivities. The at least (N−3) common optical filter structures are disposed on at least (N−3) optical branch sections in a one-to-one correspondence, a wavelength of an optical signal reflected by each of the at least (N−3) common optical filter structures is a common wavelength, the special optical filter structure includes at least one of a first special optical filter structure and a second special optical filter structure, a wavelength of an optical signal reflected by the first special optical filter structure is a first special wavelength, and a wavelength of an optical signal reflected by the second special optical filter structure is a second special wavelength. Different wavelength values in at least (N−3) common wavelengths constitute an arithmetic sequence, a difference between the first special wavelength and a largest common wavelength is greater than a tolerance of the arithmetic sequence, and a difference between the second special wavelength and a smallest common wavelength is greater than the tolerance of the arithmetic sequence. Because two types of wavelengths are set, and different reflectivities in a case of a same wavelength are further set, when test light is sent on a network side to detect an optical link on which a terminal is located, types of the test light can be greatly reduced, wavelength resources can be reduced, a wavelength scanning range of the test light on the network side can be reduced, a production difficulty and costs of a component for sending the test light on the network side can be reduced, and implementation is easy.

With reference to the second aspect, in a first possible implementation, when the splitter includes the first special optical filter structure and the second special optical filter structure, both the first special optical filter structure and the second special optical filter structure are disposed on the optical input section, where a quantity of the at least (N−3) optical branch sections is (N−1) or N; or the first special optical filter structure and the second special optical filter structure are disposed on two optical branch sections, where the two optical branch sections do not belong to the at least (N−3) optical branch sections, and a quantity of the at least (N−3) optical branch sections is (N−3) or (N−2); or one of the first special optical filter structure and the second special optical filter structure is disposed on the optical input section, and the other one of the first special optical filter structure and the second special optical filter structure is disposed on one optical branch section, where the one optical branch section does not belong to the at least (N−3) optical branch sections, and a quantity of the at least (N−3) optical branch sections is (N−2) or (N−1).

With reference to the second aspect, in a second possible implementation, when the splitter includes only the first special optical filter structure or only the second special optical filter structure, the first special optical filter structure or the second special optical filter structure is disposed on the optical input section, where a quantity of the at least (N−3) optical branch sections is (N−1) or N; or the first special optical filter structure or the second special optical filter structure is disposed on one optical branch section, where the one optical branch section does not belong to the at least (N−3) optical branch sections, and a quantity of the at least (N−3) optical branch sections is (N−2) or (N−1).

With reference to any one of the second aspect and the foregoing possible implementations, in a third possible implementation, the splitter is an even splitter or an uneven splitter. When the splitter is an uneven splitter, the uneven splitter further includes one bypass optical output section, an optical filter structure disposed on the bypass optical output section reflects an optical signal of one bypass wavelength at a specific reflectivity, and the bypass wavelength is different from any one of the common wavelength, the first special wavelength, and the second special wavelength.

With reference to any one of the second aspect and the foregoing possible implementations, in a fourth possible implementation, the splitter further includes a temperature drift consistency package. The temperature drift consistency package is configured to: when an ambient temperature changes, make a temperature inside the temperature drift consistency package be uniformly distributed. The at least (N−1) optical filter structures are packaged and fastened inside the temperature drift consistency package, or the at least (N−3) common optical filter structures are packaged and fastened inside the temperature drift consistency package. Because temperature drift consistency is much better than that of distributed common gratings, utilization of narrow-bandwidth, small-spacing, and high-density spectrum resources is efficiently implemented at low costs without using expensive temperature compensation measures.

According to a third aspect, an optical distribution network is provided. The optical distribution network includes a first-stage splitter and a second-stage splitter. Each of the first-stage splitter and the second-stage splitter may be the splitter according to any one of the first aspect and the implementations of the first aspect, or may be the splitter according to any one of the second aspect and the implementations of the second aspect. A difference between a largest value in wavelengths of optical signals reflected by an optical filter structure of the first-stage splitter and a smallest value in wavelengths of optical signals reflected by an optical filter structure of the second-stage splitter is greater than a tolerance of an arithmetic sequence. Because two types of wavelengths, namely, a common-difference wavelength and a special wavelength, are set, when test light is sent on a network side to detect an optical link on which a terminal is located, types of the test light can be greatly reduced, wavelength resources can be reduced, a wavelength scanning range of the test light on the network side can be reduced, a production difficulty and costs of a component for sending the test light on the network side can be reduced, and implementation is easy.

According to a fourth aspect, a method for determining a wavelength corresponding to an optical filter structure included in a splitter is provided. The method is applied to a network device, and includes: sequentially sending M test optical signals based on stored common wavelengths and special wavelengths at a default temperature and a maximum drift value, and receiving X reflected optical signals, where X is less than M, X and M are natural numbers, the reflected optical signal is reflected when the test optical signal encounters an optical filter structure of the splitter, a wavelength of the test optical signal falls within a range between a drift difference and a drift sum, the drift difference is a smallest value in the common wavelengths and the special wavelengths at the default temperature minus the maximum drift value, the drift sum is a largest value in the common wavelengths and the special wavelengths at the default temperature plus the maximum drift value, the common wavelength is a wavelength of an optical signal reflected by a common optical filter structure, and the special wavelength is a wavelength of an optical signal reflected by a special optical filter structure; and determining, based on wavelengths of test optical signals corresponding to the received X reflected optical signals, at least one of a stored mapping relationship between the special wavelength and an optical branch section and a stored mapping relationship between the special wavelength and an optical input section at the default temperature, and a mapping relationship between the common wavelength and the optical branch section at the default temperature, a wavelength corresponding to each optical branch section at a current temperature. Because two types of wavelengths, namely, a common-difference wavelength and a special wavelength, are set, when test light is sent on a network side to detect an optical link on which a terminal is located, types of the test light can be greatly reduced, wavelength resources can be reduced, a wavelength scanning range of the test light on the network side can be reduced, a production difficulty and costs of a component for sending the test light on the network side can be reduced, and implementation is easy.

With reference to the fourth aspect, in a first possible implementation, the sequentially sending M test optical signals specifically includes: sending one test optical signal at an interval of a fixed step within the range between the drift difference and the drift sum.

With reference to the fourth aspect, in a second possible implementation, the sequentially sending M test optical signals specifically includes: sending one test optical signal at an interval of a fixed step within the range between the drift difference and the drift sum, and after the first reflected optical signal is received, sending one test optical signal at an interval of a tolerance by using a wavelength of a test optical signal corresponding to the first reflected signal as a reference. The fixed step is less than the tolerance, and the tolerance is a tolerance of an arithmetic sequence formed by all the common wavelengths at the default temperature.

With reference to any one of the fourth aspect and the foregoing possible implementations, in a third possible implementation, after the determining a wavelength corresponding to each optical branch section at a current temperature, the method further includes: calculating, based on a stored reflectivity of a common optical filter structure of an optical branch section, theoretical power of a reflected optical signal reflected by the common optical filter structure of the optical branch section; and determining, based on actual power of receiving the reflected optical signal reflected by the optical branch section and the theoretical power, whether an optical link between the optical branch section and the network device is abnormal.

According to a fifth aspect, a network device is provided. The network device includes a transceiver and a processor. The transceiver is configured to: sequentially send M test optical signals based on stored common wavelengths and special wavelengths at a default temperature and a maximum drift value, and receive X reflected optical signals. The reflected optical signal is reflected when the test optical signal encounters an optical filter structure of a splitter. A wavelength of the test optical signal falls within a range between a drift difference and a drift sum. The drift difference is a smallest value in the common wavelengths and the special wavelengths at the default temperature minus the maximum drift value, and the drift sum is a largest value in the common wavelengths and the special wavelengths at the default temperature plus the maximum drift value. The common wavelength is a wavelength of an optical signal reflected by a common optical filter structure, and the special wavelength is a wavelength of an optical signal reflected by a special optical filter structure. The processor is configured to determine, based on wavelengths of test optical signals corresponding to the received X reflected optical signals, at least one of a stored mapping relationship between the special wavelength and an optical branch section and a stored mapping relationship between the special wavelength and an optical input section at the default temperature, and a mapping relationship between the common wavelength and the optical branch section at the default temperature, a wavelength corresponding to each optical branch section at a current temperature. Because two types of wavelengths, namely, a common-difference wavelength and a special wavelength, are set, when test light is sent on a network side to detect an optical link on which a terminal is located, types of the test light can be greatly reduced, wavelength resources can be reduced, a wavelength scanning range of the test light on the network side can be reduced, a production difficulty and costs of a component for sending the test light on the network side can be reduced, and implementation is easy.

With reference to the fifth aspect, in a first implementation of the fifth aspect, the transceiver is configured to send one test optical signal at an interval of a fixed step within the range between the drift difference and the drift sum.

With reference to the fifth aspect, in a second possible implementation of the fifth aspect, the transceiver is configured to: send one test optical signal at an interval of a fixed step within the range between the drift difference and the drift sum, and after the first reflected optical signal is received, send one test optical signal at an interval of a tolerance by using a wavelength of a test optical signal corresponding to the first reflected signal as a reference. The fixed step is less than the tolerance, and the tolerance is a tolerance of an arithmetic sequence formed by all the common wavelengths at the default temperature.

With reference to any one of the fifth aspect and the foregoing possible implementations, in a third possible implementation, the processor is further configured to: calculate, based on a stored reflectivity of a common optical filter structure of an optical branch section, theoretical power of a reflected optical signal reflected by the common optical filter structure of the optical branch section; and determine, based on actual power of receiving the reflected optical signal reflected by the optical branch section and the theoretical power, whether an optical link between the optical branch section and the network device is abnormal.

If the network device stores a reflectivity, for example, 50%, of a common optical filter structure disposed on an optical branch section, theoretical power of a reflected optical signal reflected by the common optical filter structure of the optical branch section may be calculated, that is, the theoretical power is 50% of power of a tested optical signal. Actual power of the actually received reflected optical signal is measured. If a difference between the theoretical power and the actual power is less than or equal to a specific threshold, it indicates that an optical link between the optical branch section and the network device is normal; or if a difference between the theoretical power and the actual power exceeds the threshold, it indicates that an optical link between the optical branch section and the network device is abnormal.

According to a sixth aspect, a passive optical network PON system is provided. The PON system includes the foregoing device and the foregoing optical distribution network ODN.

According to still another aspect of this application, a computer-readable storage medium is provided. The computer-readable storage medium stores corresponding computer software instructions used by the network device in any one of the fourth aspect and the implementations of the fourth aspect, and when the computer software instructions run on a computer, the computer performs the corresponding method steps in the foregoing aspects.

BRIEF DESCRIPTION OF THE DRAWINGS

To describe the technical solutions in embodiments of the present invention more clearly, the following briefly describes the accompanying drawings for describing embodiments. It is clearly that the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
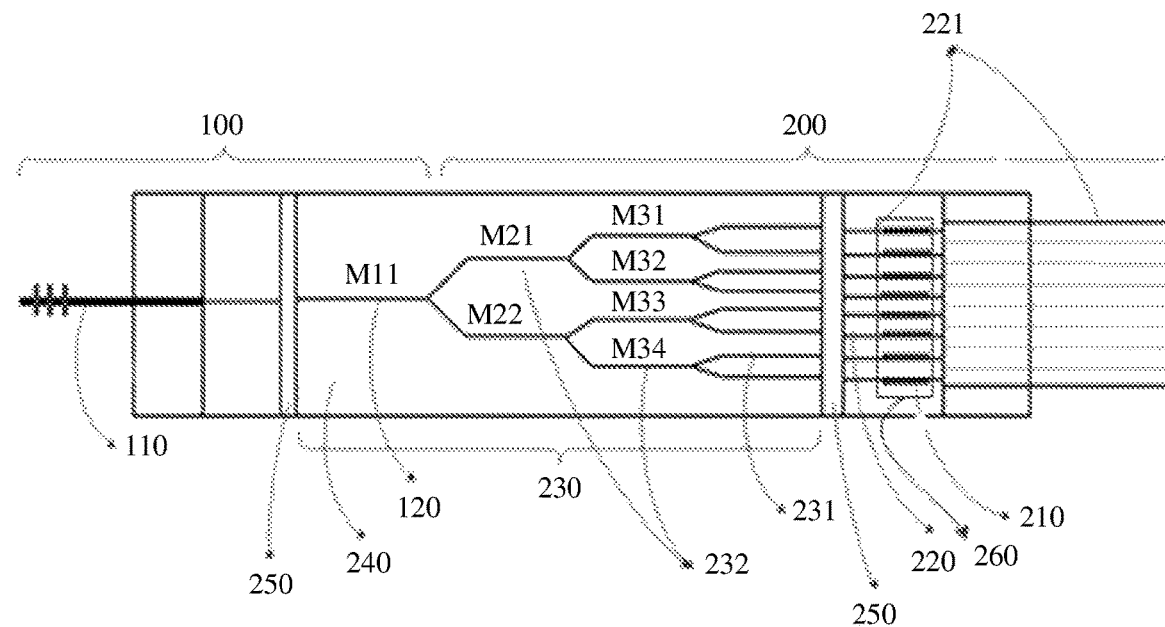
FIG. 1 is a schematic diagram of a structure of a PLC splitter according to an embodiment of the present invention.

To make the objectives, technical solutions, and advantages of embodiments of the present invention clearer, the following clearly describes the technical solutions in embodiments of the present invention with reference to the accompanying drawings in embodiments of the present invention. It is clear that the described embodiments are some but not all of embodiments of the present invention. All other embodiments obtained by a person of ordinary skill in the art based on embodiments of the present invention without creative efforts shall fall within the protection scope of the present invention.

Embodiments of the present invention are applied to a passive optical network (PON) system. The passive optical network system usually includes an optical line terminal (OLT), an optical distribution network (ODN), and an optical network unit (ONU). The ODN provides an optical transmission physical channel between the OLT and the ONU. The PON system in embodiments of this application may be a next-generation PON (NG-PON), an NG-PON 1, an NG-PON 2, a gigabit-capable PON (GPON), a 10 gigabit per second PON (XG-PON), a 10-gigabit-capable symmetric passive optical network (XGS-PON), an Ethernet PON (EPON), a 10 gigabit per second EPON (10G-EPON), a next-generation EPON (NG-EPON), a wavelength-division multiplexing (WDM) PON, a time- and wavelength-division multiplexing (TWDM) PON, a point-to-point (P2P) WDM PON (P2P-WDM PON), an asynchronous transfer mode PON (APON), a broadband PON (BPON), a 25 gigabit per second PON (25G-PON), a 50 gigabit per second PON (50G-PON), a 100 gigabit per second PON (100G-PON), a 25 gigabit per second EPON (25G-EPON), a 50 gigabit per second EPON (50G-EPON), a 100 gigabit per second EPON (100G-EPON), various other PON systems specified by the ITU, various other PON systems specified by the IEEE, or the like.

In the PON system, a direction from the OLT to the ONU is defined as a downlink direction, and a direction from the ONU to the OLT is defined as an uplink direction. The OLT is a core component of an optical access network, and is usually located in a central office (CO), and may manage at least one ONU together. The OLT is configured to provide data, provide management, and the like for each accessed ONU. The OLT may be configured to: send an optical signal to each ONU, receive information fed back by each ONU, and process the information fed back by the ONU, other data, or the like. The ONU is configured to: receive data sent by the OLT, respond to a management command of the OLT, buffer Ethernet data of a user, send data in the uplink direction in a sending window allocated by the OLT, and the like.

The ODN usually includes an optical distribution frame (ODF), a splitting and a splicing closure (SSC), a fiber distribution terminal (FDT), a fiber access terminal (FAT), an access terminal box (ATB), and the like. The FDT may include a splitter 1, and the FAT may include a splitter 2. An optical signal coming from the OLT sequentially passes through the ODF, the SSC, the splitter 1 in the FDT for optical splitting, the splitter 2 in the FAT for optical splitting, and the ATB, and then arrives at the ONU. In other words, the optical signal coming from the OLT is transmitted to the ONU through an optical link between the OLT and the ONU. The splitter 1 equally divides power of the received optical signal. One branch is transmitted to the splitter 2. Then the splitter 2 equally divides power of the received optical signal. All branches are separately transmitted to the connected ONU. An output end of a last-stage splitter in the ODN is used as an output port of the ODN, and the ONU is connected to the output port of the ODN.

Embodiments of this application provide a splitter. The splitter may also be referred to as a splitter module, an optical splitter, or the like. The splitter is configured to split one optical signal into a plurality of optical signals. The splitter may be used in a scenario in which optical splitting is required, for example, in an optical distribution network (ODN). In an example in which the splitter is used in the ODN, the splitter may be disposed in the optical splitting apparatus. The optical splitting apparatus may be, for example, a device such as the ODF, the SSC, the FDT, the FAT, or the ATB, or may be another device in the ODN.

Figure 3:
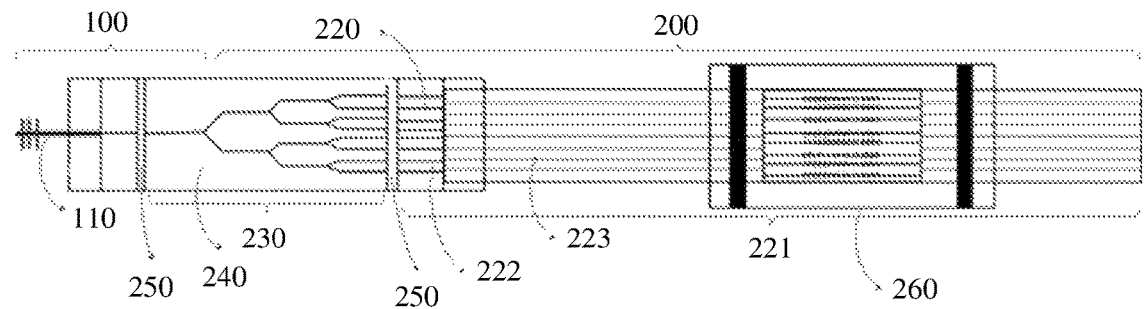
FIG. 3 is a schematic diagram of a structure of a PLC splitter according to still another embodiment of the present invention.
Figure 4:
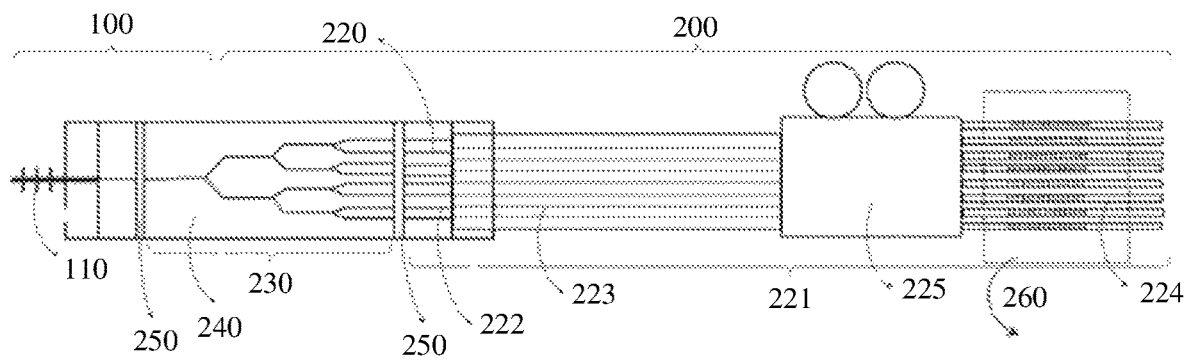
FIG. 4 is a schematic diagram of a structure of a PLC splitter according to still another embodiment of the present invention.
Figure 5:
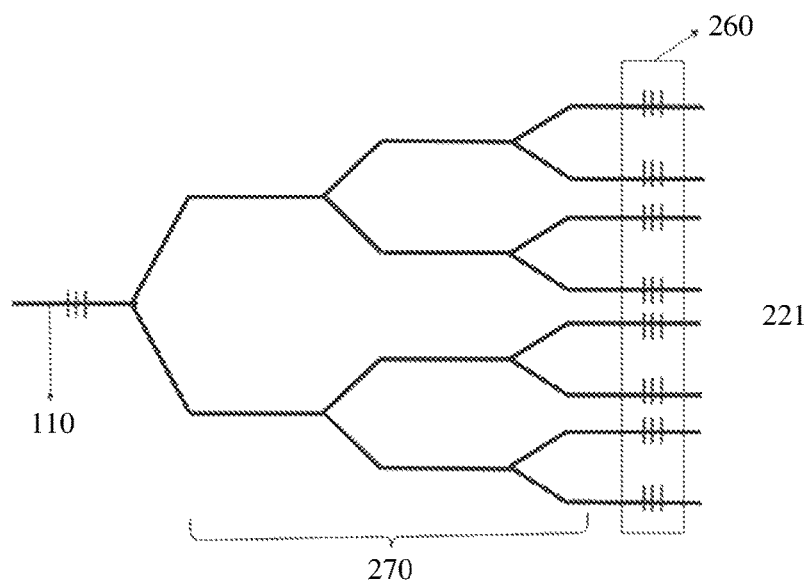
FIG. 5 is a schematic diagram of a structure of an FBT splitter according to an embodiment of the present invention.
Figure 6:
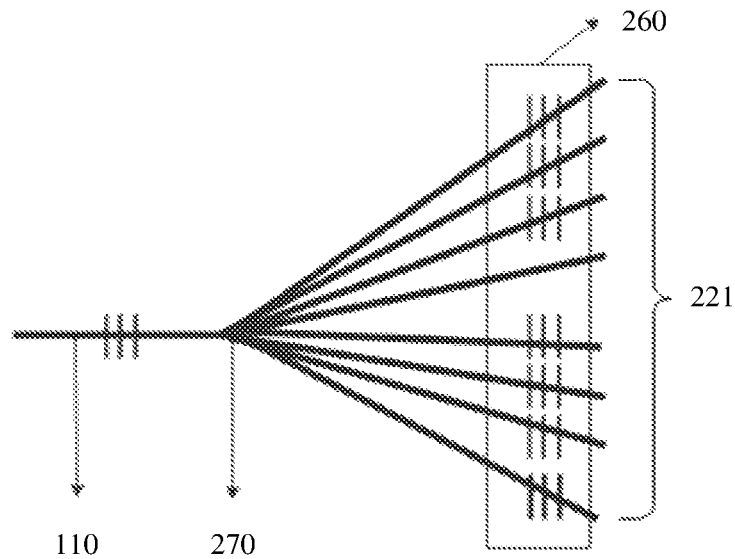
FIG. 6 is a schematic diagram of a structure of an FBT splitter according to another embodiment of the present invention.

In embodiments of the present invention, referring to FIG. 1, FIG. 2, FIG. 3, FIG. 4, FIG. 5, and FIG. 6, FIG. 1 to FIG. 4 are schematic diagrams of structures of a planar lightwave circuit (PLC) splitter according to embodiments of the present invention, and FIG. 5 and FIG. 6 are schematic diagrams of structures of a fused biconical taper (FBT) splitter according to embodiments of the present invention. The splitter includes an optical input section 100 and N optical branch sections 200. N is an integer greater than or equal to 2. An optical signal enters from the optical input section 100, and is output from the N optical branch sections 200. An optical filter structure 210 may be disposed on the optical input section 100 and each of at least (N−3) optical branch sections 200. Each optical filter structure reflects an optical signal of one wavelength at a specific reflectivity or transmits an optical signal of one wavelength at a specific transmittance, which may also mean that the optical filter structure 210 reflects optical signals of one center wavelength at a specific reflectivity or transmits optical signals of one center wavelength at a specific transmittance. It may be understood that the optical filter structure 210 reflects optical signals of a wavelength range. The optical signals of the wavelength range have a center wavelength, and a reflectivity reaches a maximum value or a transmittance reaches a minimum value on the center wavelength. Optical filter structures 210 disposed on the optical branch sections 200 may be jointly located in a temperature drift consistency package 260. The temperature drift consistency package 260 may be configured to: when an ambient temperature of the splitter changes, make a temperature inside the temperature drift consistency package be uniformly distributed. It should be noted that, because the temperature inside the temperature drift consistency package is evenly distributed, when the ambient temperature changes, temperature drift directions and values of wavelengths corresponding to lightwaves that can be reflected by the optical filter structures 210 are the same, and a drift relationship of positive correlation between a wavelength of a lightwave reflected by the optical filter structure 210 and a temperature may be obtained through experiment and calculation. For example, if each optical filter structure 210 is a fiber Bragg grating (FBG), a drift relationship of positive correlation between a wavelength of a lightwave reflected by the FBG and a temperature is 0.01 nm/° C., that is, when a current ambient temperature is 10° C. higher than a reference temperature, a wavelength of a lightwave currently reflected by the FBG is 0.01 nm longer than a reference reflecting wavelength of the FBG. Therefore, it can be learned that the temperature drift consistency package 260 can ensure that wavelengths of lightwaves reflected by adjacent gratings do not overlap when the ambient temperature changes. It should be noted that the foregoing reference temperature is usually a normal temperature, and normal temperatures of different regions are different. A normal temperature of Chinese mainland is usually 20° C. The temperature drift consistency package 260 may be implemented by using a metal package, for example. In an embodiment, the temperature drift consistency package 260 can further stretch a part that is of a ribbon fiber 223 and on which a grating is disposed as tight as possible, fasten the part, and make the part suspend, so that impact on the grating that is caused by an external environment factor, for example, impact on a grating period that is caused by stress generated by manual pulling, wind blowing, or the like, is reduced to the greatest extent, thereby protecting the grating. In addition, it should be noted that the optical input section wo may include a common port, the optical branch output sections 200 may be in a one-to-one correspondence with branch ports, and a branch port corresponding to an optical branch output section 200 may be identified based on an optical filter structure that is disposed on the optical branch output section 200 and that is used to reflect optical signals of different wavelengths. Structurally, the optical branch output section 200 may include the branch port.

The following further describes different types of splitters.

In some embodiments, the optical input section 100 is an optical path used to transmit one optical signal in the splitter. Inside the splitter, one optical signal is split into N optical signals, and the optical branch section 200 is an optical path after the optical input section 100. In some embodiments, there may be one or two optical input sections 100 of the splitter. Taking two optical input sections 100 as an example, when the splitter is used by the ODN to perform optical splitting, one of the optical input sections 100 may be connected to a primary fiber, and the other optical input section 100 may be connected to a secondary fiber.

In some embodiments, the splitter shown in FIG. 1 to FIG. 4 is a PLC splitter, and the PLC splitter includes an optical input fiber 110, N optical output fibers 221, and a planar lightwave circuit 230. The PLC splitter may further include a substrate 240, and the planar lightwave circuit 230 is disposed on the substrate 240. The planar lightwave circuit 230 includes an optical input waveguide 120, N optical output waveguide 231, and an intermediate branch waveguide 232 connected between the optical input waveguide and the N optical output waveguide 231. The optical input fiber no is connected to the optical input waveguide. The N optical output fibers 221 are connected to the N optical output waveguide 231 in a one-to-one correspondence. The PLC splitter may further include a bonding agent 250, configured to connect the optical input fiber no to the optical input waveguide and connect the optical output fiber 221 to the optical output waveguide 231. The optical input section 100 includes the optical input fiber no and the optical input waveguide. Each optical branch section 200 includes the intermediate branch waveguide 232 and a pair including one optical output waveguide 231 and one optical output fiber 221 that are connected to each other. It may be understood that each optical branch section 200 includes a part of the intermediate branch waveguide 232. For example, the intermediate branch waveguide 232 in the first optical branch section 200 shown in FIG. 1 includes M21 and M31, and the intermediate branch waveguide 232 in the second optical branch section 200 includes M21 and M32. In an embodiment, ends of the N optical output fibers 221 form a fiber array 220, the substrate 240 and the planar lightwave circuit form a splitter chip, the splitter chip and the fiber array 220 are bonded together by using the bonding agent 250, and the N optical output waveguide 231 are connected to the N optical output fibers 221 in a one-to-one correspondence.

In some other embodiments, the splitter shown in FIG. 5 and FIG. 6 is an FBT splitter, and the FBT splitter includes an optical input fiber 110, a coupling area fiber 270, and N optical output fibers 221. The FBT splitter binds two or more fibers together, performs fusion stretching on a taper, and monitors a change of a split ratio in real time. After the split ratio meets a requirement, the fusion stretching ends. One fiber is retained at an input end, the other fibers are cut off, the retained fiber is used as the optical input fiber 110, and fibers at an output end are used as the N optical output fibers 221. The optical input section 100 may include the optical input fiber 110, and the optical branch section 200 may include the N optical output fibers 221.

Figure 2:
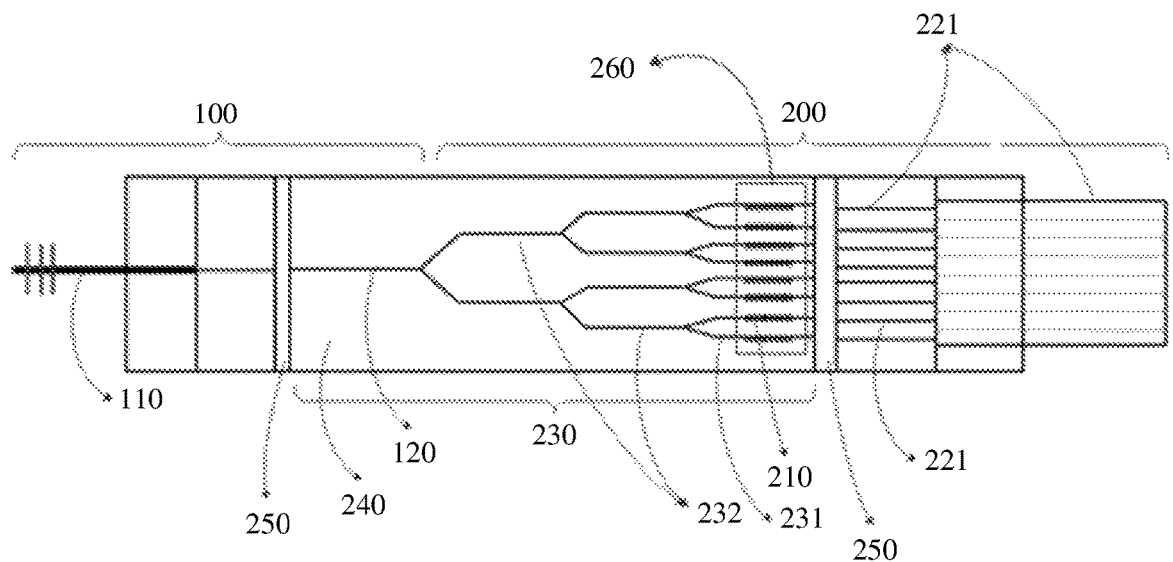
FIG. 2 is a schematic diagram of a structure of a PLC splitter according to another embodiment of the present invention.

In some embodiments, for the PLC splitter, the optical filter structure 210 may be disposed on the optical output waveguide 231 (as shown in FIG. 2) or the optical output fiber 221 (as shown in FIG. 1, FIG. 3, and FIG. 4).

In some embodiments, as shown in FIG. 3 and FIG. 4, the optical output fiber 221 includes a fiber 222 in the fiber array 220, a ribbon fiber 223, a tail fiber 224, and the like. As shown in FIG. 4, the splitter further includes a branching component 225. One end of the branching component 225 is connected to the ribbon fiber 223, and the other end of the branching component 225 is connected to the tail fiber 224. The ribbon fiber 223 is located between the branching component 225 and the fiber 222 in the fiber array 220. That the optical filter structure 210 is disposed on the optical output fiber 221 includes: The optical filter structure 210 is disposed on the fiber 222 in the fiber array 220 (as shown in FIG. 1), the ribbon fiber 223 (as shown in FIG. 3), or the tail fiber.

In some embodiments, as shown in FIG. 2, all of M optical filter structures 210 on one optical branch section 200 are disposed on the optical output waveguide 231, or may be disposed on the optical output fiber 221. As shown in FIG. 1, all of M optical filter structures 210 on one optical branch section 200 are disposed on the fiber 222 in the fiber array 220; or as shown in FIG. 3, all of M optical filter structures 210 on one optical branch section 200 are disposed on the ribbon fiber 223; or as shown in FIG. 4, all of M optical filter structures 210 on one optical branch section 200 are disposed on the tail fiber 224. Alternatively, M optical filter structures 210 on one optical branch section 200 may be scattered on at least two of the optical output waveguide 231, the optical output fiber 221 (including the fiber 222 in the fiber array 220, the ribbon fiber 223, and the tail fiber 224), and the intermediate branch waveguide 232. In an embodiment, as shown in FIG. 5 and FIG. 6, for the FBT splitter, the optical filter structure 210 may be disposed on the optical input fiber no or the optical output fiber 221.

In some embodiments, one optical filter structure 210 may be one grating, and the grating reflects an optical signal of one wavelength at a specific reflectivity. The grating is a diffraction grating formed by axially and periodically modulating a refractive index or a reflectivity of the optical branch section 200 using a specific method. The grating may be a fiber grating (that is, the grating is formed on a fiber), or may be a waveguide grating (that is, the grating is formed on a waveguide). The fiber grating may be an FBG, or may be a long-period fiber grating (LPFG).

The fiber grating is used as an example. Generally, photosensitivity of a fiber material is used to write a coherent field pattern of incident light into a core through ultraviolet exposure, and a periodic refractive index change along a core axis is generated inside the core, so that a permanent spatial phase grating is formed. In addition, the fiber grating may be alternatively produced by using a femtosecond laser, a carbon dioxide laser, or the like. For the grating on the waveguide, the foregoing fiber grating production method may also be used. A grating may be considered as a band-stop filter of a specific center wavelength. When a wide-spectrum optical signal passes through the grating, all optical signals of the specific center wavelength are reflected, and optical signals of other wavelengths pass through the grating and continue to be transmitted. Alternatively, the grating reflects optical signals of the specific center wavelength at a specific reflectivity. To be specific, some of the optical signals of the specific center wavelength are reflected, some of the optical signals of the specific center wavelength pass through the grating and continue to be transmitted, and optical signals of other wavelengths pass through the grating and continue to be transmitted. It may be understood that the grating filters out optical signals of a wavelength range, and the optical signals of the wavelength range have the center wavelength. The center wavelength and the reflectivity (or the transmittance) may be controlled by adjusting a grating period, a grating pitch, and an exposure time in a grating production process.

In another embodiment, the optical filter structure 210 may be alternatively a filter coating. The filter coating may be a coating plated on a waveguide or a fiber. For example, the coating may be plated on an end face of the waveguide, may be plated after an opening is provided on the waveguide, may be plated on an end face of the fiber, or may be plated after an opening is provided on the fiber. For a setting manner of a quantity of filter coatings on each optical branch section 200 and positions of the filter coatings, refer to corresponding descriptions of the foregoing grating. Details are not described herein again. It may be understood that the filter coating filters out optical signals of a wavelength range, and the optical signals of the wavelength range have the center wavelength. It may be understood that when the optical filter structure 210 is a filter coating, the foregoing beneficial effects can also be achieved in the manner shown in FIG. 1 to FIG. 4. Details are not described herein again.

It may be understood that the optical input fiber no is a fiber at an end at which there are fewer branches of the splitter. The optical output fiber 221 is a fiber at an end at which there are more branches of the splitter. An optical signal may enter from the optical input fiber 110, and be split into a plurality of optical signals by using the splitter, and the plurality of optical signals are output through the optical output fibers 221. The optical signal may alternatively enter from the optical output fiber 221, and be output through the optical input fiber 110.

In an embodiment, the splitter is an even splitter. Power of optical signals output by N optical branch sections 200 of the even splitter is the same or substantially the same. The even splitter may be the PLC splitter shown in FIG. 1 to FIG. 4, or the even splitter may be the FBT splitter shown in FIG. 5 and FIG. 6.

With reference to the foregoing content, the even splitter and an uneven splitter in embodiments of the present invention are further described.

In embodiments of the present invention, in one even splitter, there are two types of optical filter structures, which are a common optical filter structure and a special optical filter structure. All common optical filter structures are disposed on optical branch sections. It should be noted that materials or structures of the common optical filter structure and the special optical filter structure may be the same. The special optical filter structure may be disposed on the optical input section, or may be disposed on the optical branch section. The common optical filter structure can filter out an optical signal of a common wavelength. A specific common wavelength corresponds to an optical branch section of the splitter. One optical branch section may be considered as one port of the splitter. Different ports of the splitter may be identified by using different common wavelengths corresponding to these common optical filter structures, and all common wavelengths inside the splitter may constitute an arithmetic sequence. The special optical filter structure can filter out an optical signal of a special wavelength. A difference between the special wavelength and a largest wavelength or a smallest wavelength in all common wavelengths is far greater than a tolerance. Special optical filter structures may be classified into a first special optical filter structure and a second special optical filter structure. A difference between a wavelength corresponding to the first special optical filter structure and the largest common wavelength is greater than the tolerance of the arithmetic sequence, and a difference between a wavelength corresponding to the second special optical filter structure and the smallest common wavelength is greater than the tolerance of the arithmetic sequence. The wavelength corresponding to the first special optical filter structure is a wavelength corresponding to an optical signal that can be filtered out by the first special optical filter structure, and the wavelength corresponding to the second special optical filter structure is a wavelength corresponding to an optical signal that can be filtered out by the second special optical filter structure. For ease of description, the wavelength corresponding to the first special optical filter structure may be referred to as a first special wavelength, and the wavelength corresponding to the second special optical filter structure may be referred to as a second special wavelength. For example, the difference between the first special wavelength and the largest common wavelength is 2 nm, and the tolerance is 0.5 nm. The splitter in embodiments of the present invention may include only the first special optical filter structure or the second special optical filter structure, or the splitter may include both the first special optical filter structure and the second special optical filter structure. The splitter may have different designs based on a quantity of special optical filter structures and positions at which the special optical filter structures are disposed. Further descriptions are provided in the following specific embodiments. In the foregoing design of the first special wavelength, the second special wavelength, and the common wavelength, a special wavelength may be determined by determining a difference between wavelengths corresponding to optical filter structures that can reflect optical signals, and once the special wavelength is determined, a port of the splitter corresponding to a common wavelength may be determined by using a difference between the common wavelength and the special wavelength. In addition, in embodiments of the present invention, the temperature drift consistency package is used to package all the common optical filter structures, and wavelengths corresponding to all the common optical filter structures change with the temperature in an equal proportion. Therefore, common wavelengths obtained after changing with the temperature still constitute an arithmetic sequence. In the foregoing structural design, occupation of a wavelength range corresponding to optical filter structures in one splitter can be minimized, so that precious wavelength resources can be reduced. In addition, drifts of all wavelengths can be the same by using the temperature drift consistency package, so that the common wavelengths constitute an arithmetic sequence at different temperatures.

The foregoing design is specifically described by using some examples below. For ease of description, common optical filter structures and special optical filter structures in the following embodiments are FBGs. A process and a principle of implementing the present invention by using another type of optical filter structure are the same. The splitter is described by using a 1:8 splitter, that is, includes one optical input section 100 and eight optical branch sections 200. A structural design of another type of splitter such as 1:12 splitter or a 1:16 splitter is the same as that of the 1:8 splitter.

Figure 7:
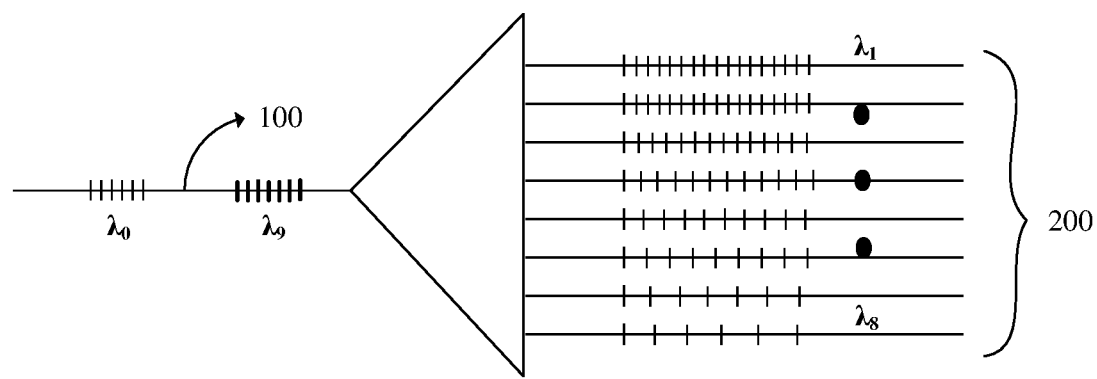
FIG. 7 is a schematic diagram of a structure of an even splitter in Scenario 1 according to an embodiment of the present invention.

Scenario 1: As shown in FIG. 7, both the first special optical filter structure and the second special optical filter structure exist, both the first special optical filter structure and the second special optical filter structure are disposed on the optical input section 100, and common optical filter structures are disposed on the eight optical branch sections 200. In this scenario, a total of N (N=8) common wavelengths are required.

It is assumed that at the normal temperature (20 degrees Celsius), the first special wavelength $\lambda_9$ is 1630.5 nm, the second special wavelength $\lambda_0$ is 1623 nm, eight common wavelengths of the common optical filter structures disposed on the eight optical branch sections are $\lambda_1$=1625 nm, $\lambda_2$=1625.5 nm, $\lambda_3$=1626 nm, $\lambda_4$=1626.5 nm, $\lambda_5$=1627 nm, $\lambda_6$=1627.5 nm, $\lambda_7$=1628 nm, and $\lambda_8$=1628.5 nm. From the foregoing specific example, it can be learned that the eight common wavelengths can constitute an arithmetic sequence whose first term is 1625 and whose tolerance is 0.5, the first special wavelength is 2 nm larger than the largest common wavelength 1628.5 nm, and the second special wavelength is 2 nm smaller than the smallest common wavelength 1625 nm, in other words, the differences are far greater than the tolerance 0.5. In this way, only a wavelength range of 1630.5 nm−1623 nm=7.5 nm is required for designing a splitter with eight branch ports. In comparison with a design in the conventional technology in which a wavelength range of at least 20 nm is required for a 1:8 splitter, occupation of wavelengths can be greatly reduced. An OTDR outputs wide-spectrum scanning probe light. The wide-spectrum scanning probe light is reflected by an end face of a branch line, and is blocked by a Bragg grating on the branch near a specific wavelength. Based on the mapping relationship determined above, each branch line can be identified, and opening/closing of the branch line can be detected. A transmission loss of a corresponding branch can be estimated by comparing a historical record and detected optical power of an optical signal reflected by an end face of the branch.

Figure 8:
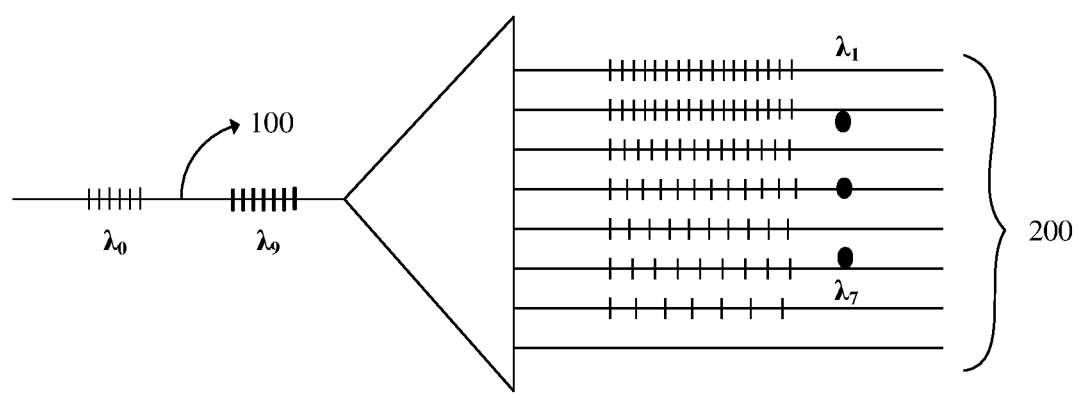
FIG. 8 is a schematic diagram of a structure of an even splitter in Scenario 2 according to an embodiment of the present invention.

Scenario 2: As shown in FIG. 8, both the first special optical filter structure and the second special optical filter structure exist, both the first special optical filter structure and the second special optical filter structure are disposed on the optical input section, no optical filter structure is disposed on one of the eight optical branch sections, and common optical filter structures are disposed on the other seven optical branch sections. In this scenario, a total of (N−1)(N−1=7) common wavelengths are required.

In comparison with Scenario 1, one common wavelength is reduced. Therefore, the first special wavelength may be set to $\lambda_9$=1630 nm. In this way, only a wavelength range of 1630 nm−1623 nm=7 nm is required for designing a splitter with eight branch ports.

Figure 9:
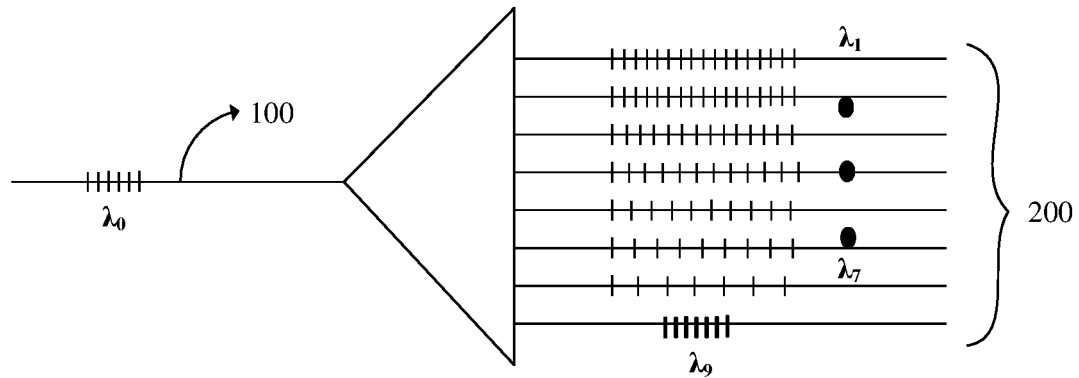
FIG. 9 is a schematic diagram of a structure of an even splitter in Scenario 3 according to an embodiment of the present invention.

Scenario 3: As shown in FIG. 9, both the first special optical filter structure and the second special optical filter structure exist, one of the first special optical filter structure and the second special optical filter structure is disposed on the optical input section, and the other one of the first special optical filter structure and the second special optical filter structure is disposed on one of the eight optical branch sections (the first special optical filter structure is disposed on the optical input section, and the second special optical filter structure is disposed on one of the eight optical branch sections; or the first special optical filter structure is disposed on one of the eight optical branch sections, and the second special optical filter structure is disposed on the optical input section), and common optical filter structures are disposed on the other seven optical branch sections in the eight optical branch sections. In this scenario, a total of (N−1) (N−1=7) common wavelengths are required.

In comparison with Scenario 1, one common wavelength is reduced. Therefore, the first special wavelength may be set to $\lambda_9$=1630 nm. In this way, only a wavelength range of 1630 nm−1623 nm=7 nm is required for designing a splitter with eight branch ports.

Figure 10:
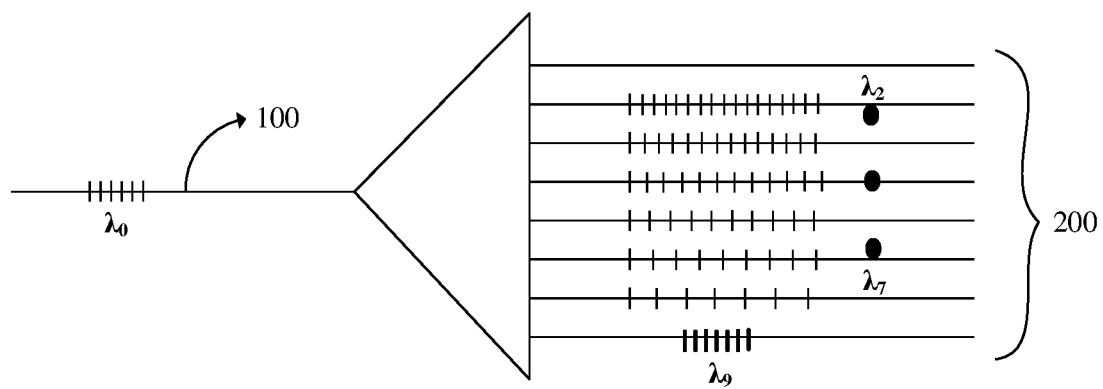
FIG. 10 is a schematic diagram of a structure of an even splitter in Scenario 4 according to an embodiment of the present invention.

Scenario 4: As shown in FIG. 10, both the first special optical filter structure and the second special optical filter structure exist, one of the first special optical filter structure and the second special optical filter structure is disposed on the optical input section, the other one of the first special optical filter structure and the second special optical filter structure is disposed on one of the eight optical branch sections, no optical filter structure is disposed on one of the eight optical branch sections, and common optical filter structures are disposed on the other six optical branch sections. In this scenario, a total of (N−2) (N−2=6) common wavelengths are required.

In comparison with Scenario 1, two common wavelengths are reduced. Therefore, the first special wavelength may be set to $\lambda_0$=1623.5 nm, the second special wavelength may be set to $\lambda_9$=1630 nm, and the other six common wavelengths are $\lambda_2$=1625.5 nm, $\lambda_3$=1626 nm, $\lambda_4$=1626.5 nm, $\lambda_5$=1627 nm, $\lambda_6$=1627.5 nm, and $\lambda_7$=1628 nm. In this way, only a wavelength range of 1630 nm−1623.5 nm=6.5 nm is required for designing a splitter with eight branch ports.

Figure 11:
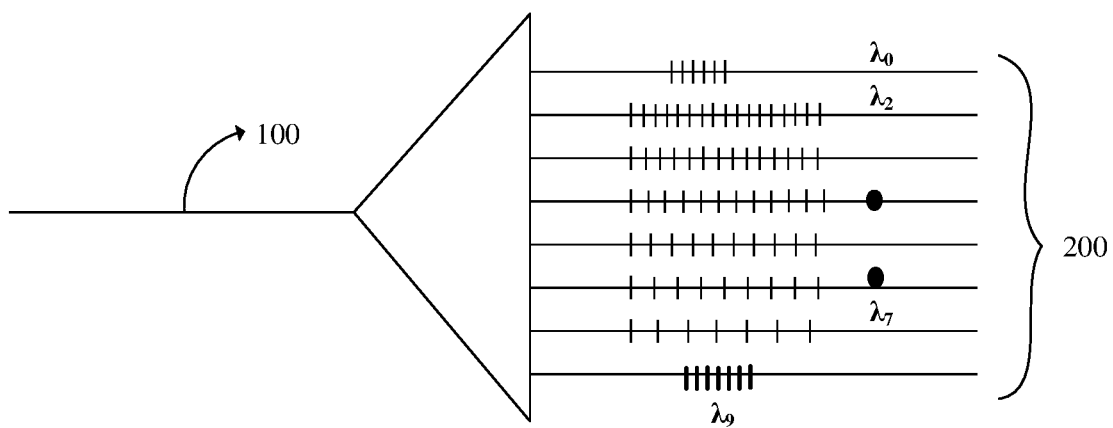
FIG. 11 is a schematic diagram of a structure of an even splitter in Scenario 5 according to an embodiment of the present invention.

Scenario 5: As shown in FIG. 11, both the first special optical filter structure and the second special optical filter structure exist, both the first special optical filter structure and the second special optical filter structure are disposed on two of the eight optical branch sections, and common optical filter structures are disposed on the other six optical branch sections in the eight optical branch sections. In this scenario, a total of (N−2) (N−2=6) common wavelengths are required.

In comparison with Scenario 1, two common wavelengths are reduced. Therefore, the first special wavelength may be set to $\lambda_0$=1623.5 nm, the second special wavelength may be set to $\lambda_9$=1630 nm, and the other six common wavelengths are $\lambda_2$=1625.5 nm, $\lambda_3$=1626 nm, $\lambda_4$=1626.5 nm, $\lambda_5$=1627 nm, $\lambda_6$=1627.5 nm, and $\lambda_7$=1628 nm. In this way, only a wavelength range of 1630 nm−1623.5 nm=6.5 nm is required for designing a splitter with eight branch ports.

Figure 12:
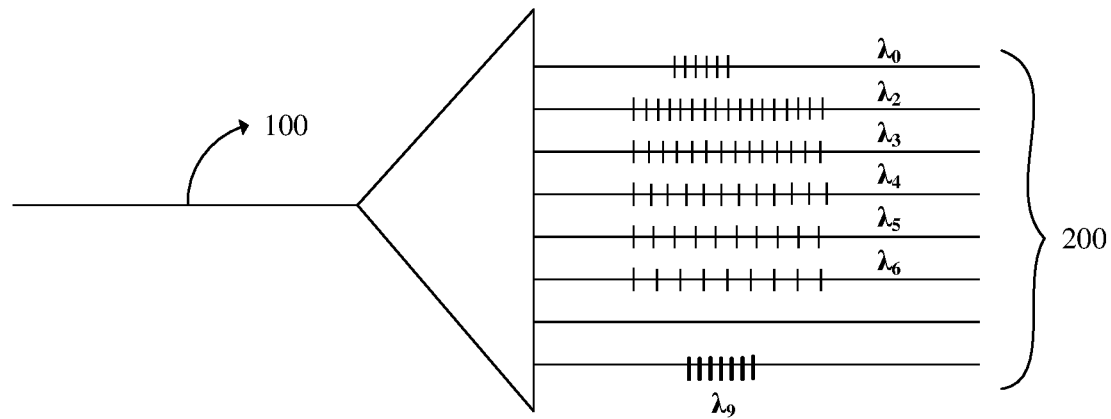
FIG. 12 is a schematic diagram of a structure of an even splitter in Scenario 6 according to an embodiment of the present invention.

Scenario 6: As shown in FIG. 12, both the first special optical filter structure and the second special optical filter structure exist, both the first special optical filter structure and the second special optical filter structure are disposed on two of the eight optical branch sections, no optical filter structure is disposed on one of the eight optical branch sections, and common optical filter structures are disposed on the other five optical branch sections. In this scenario, a total of (N−3) (N−3=5) common wavelengths are required.

In comparison with Scenario 1, three common wavelengths are reduced. Therefore, the first special wavelength may be set to $\lambda_0$=1623.5 nm, the second special wavelength may be set to $\lambda_9$=1629.5 nm, and the other five common wavelengths are $\lambda_2$=1625.5 nm, $\lambda_3$=1626 nm, $\lambda_4$=1626.5 nm, $\lambda_5$=1627 nm, and $\lambda_6$=1627.5 nm. In this way, only a wavelength range of 1629.5 nm−1623.5 nm=6 nm is required for designing a splitter with eight branch ports.

Figure 13:
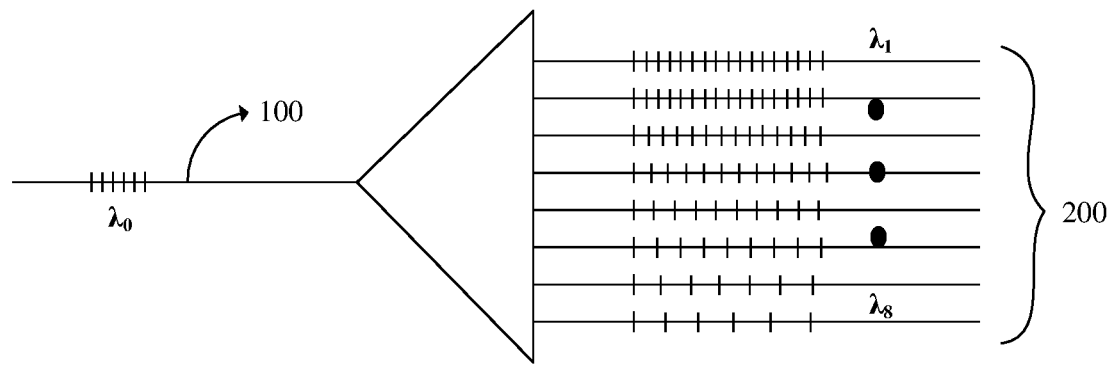
FIG. 13 is a schematic diagram of a structure of an even splitter in Scenario 7 according to an embodiment of the present invention.

Scenario 7: As shown in FIG. 13, only one special optical filter structure exists, in other words, the splitter includes only the first special optical filter structure or the second special optical filter structure, the first special optical filter structure or the second special optical filter structure is disposed on the optical input section, and common optical filter structures are disposed on the eight optical branch sections. In this scenario, a total of N (N=8) common wavelengths are required.

In comparison with Scenario 1, one special wavelength is reduced. Therefore, the first special wavelength may be set to $\lambda_0$=1623 nm, and the other eight common wavelengths are $\lambda_1$=1625 nm, $\lambda_2$=1625.5 nm, $\lambda_3$=1626 nm, $\lambda_4$=1626.5 nm, $\lambda_5$=1627 nm, $\lambda_6$=1627.5 nm, $\lambda_7$=1628 nm, and $\lambda_8$=1628.5 nm. Alternatively, the second special wavelength is set to $\lambda_9$=1630.5 nm, and the other eight common wavelengths are $\lambda_1$=1625 nm, $\lambda_2$=1625.5 nm, $\lambda_3$=1626 nm, $\lambda_4$=1626.5 nm, $\lambda_5$=1627 nm, $\lambda_6$=1627.5 nm, $\lambda_7$=1628 nm, and $\lambda_8$=1628.5 nm. In this way, only a wavelength range of 1630.5 nm−1625 nm=5.5 nm or 1630.5 nm−1625 nm=5.5 nm is required for designing a splitter with eight branch ports.

Figure 14:
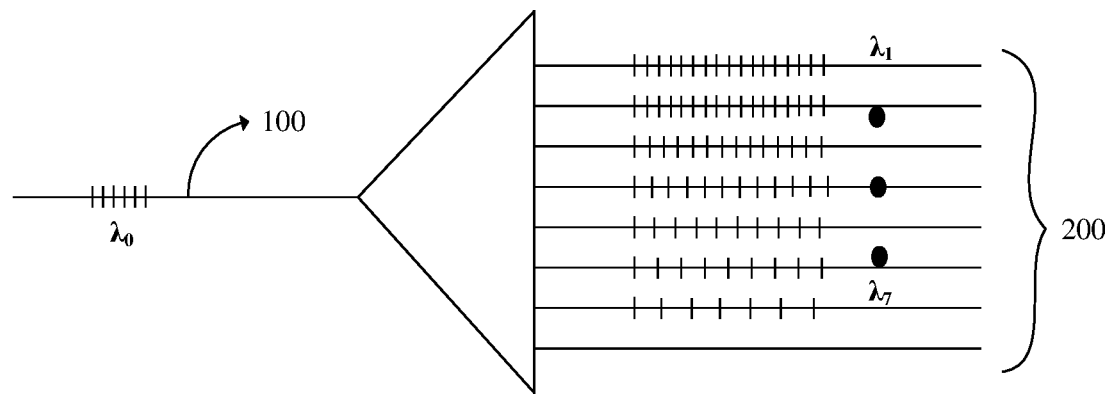
FIG. 14 is a schematic diagram of a structure of an even splitter in Scenario 8 according to an embodiment of the present invention.

Scenario 8: As shown in FIG. 14, only one special optical filter structure exists, in other words, the splitter includes only the first special optical filter structure or the second special optical filter structure, the first special optical filter structure or the second special optical filter structure is disposed on the optical input section, no optical filter structure is disposed on one of the eight optical branch sections, and common optical filter structures are disposed on the other seven optical branch sections. In this scenario, a total of (N−1) (N−1=7) common wavelengths are required.

In comparison with Scenario 1, one special wavelength and one common wavelength are reduced. Therefore, the first special wavelength may be set to $\lambda_0$=1623 nm, and the other seven common wavelengths are $\lambda_1$=1625 nm, $\lambda_2$=1625.5 nm, $\lambda_3$=1626 nm, $\lambda_4$=1626.5 nm, $\lambda_5$=1627 nm, $\lambda_6$=1627.5 nm, and $\lambda_7$=1628 nm. Alternatively, the second special wavelength is set to $\lambda_9$=1630 nm, and the other seven common wavelengths are $\lambda_1$=1625 nm, $\lambda_2$=1625.5 nm, $\lambda_3$=1626 nm, $\lambda_4$=1626.5 nm, $\lambda_5$=1627 nm, $\lambda_6$=1627.5 nm, and $\lambda_7$=1628 nm. In this way, only a wavelength range of 1628 nm−1623 nm=5 nm or 1630 nm−1625 nm=5 nm is required for designing a splitter with eight branch ports.

Figure 15:
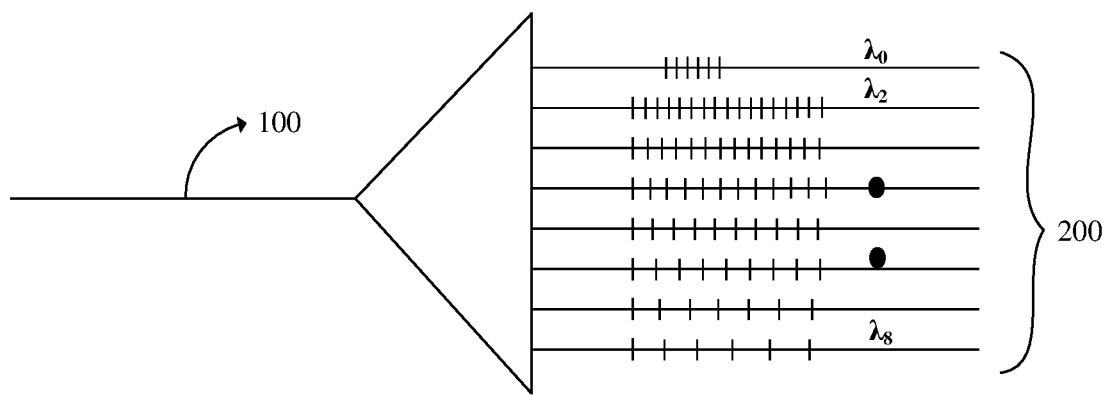
FIG. 15 is a schematic diagram of a structure of an even splitter in Scenario 9 according to an embodiment of the present invention.

Scenario 9: As shown in FIG. 15, only one special optical filter structure exists, in other words, the splitter includes only the first special optical filter structure or the second special optical filter structure, the first special optical filter structure or the second special optical filter structure is disposed on one of the eight optical branch sections, and common optical filter structures are disposed on the other seven optical branch sections in the eight optical branch sections. In this scenario, a total of (N−1) (N−1=7) common wavelengths are required.

In comparison with Scenario 1, one special wavelength and one common wavelength are reduced. Therefore, the first special wavelength may be set to $\lambda_0$=1623.5 nm, and the other seven common wavelengths are $\lambda_2$=1625.5 nm, $\lambda_3$=1626 nm, $\lambda_4$=1626.5 nm, $\lambda_5$=1627 nm, $\lambda_6$=1627.5 nm, $\lambda_7$=1628 nm, and $\lambda_8$=1628.5 nm. Alternatively, the second special wavelength is set to $\lambda_9$=1630 nm, and the other seven common wavelengths are $\lambda_1$=1625 nm, $\lambda_2$=1625.5 nm, $\lambda_3$=1626 nm, $\lambda_4$=1626.5 nm, $\lambda_5$=1627 nm, $\lambda_6$=1627.5 nm, and $\lambda_7$=1628 nm. In this way, only a wavelength range of 1628.5 nm−1623.5 nm=5 nm or 1630 nm−1625 nm=5 nm is required for designing a splitter with eight branch ports.

Figure 16:
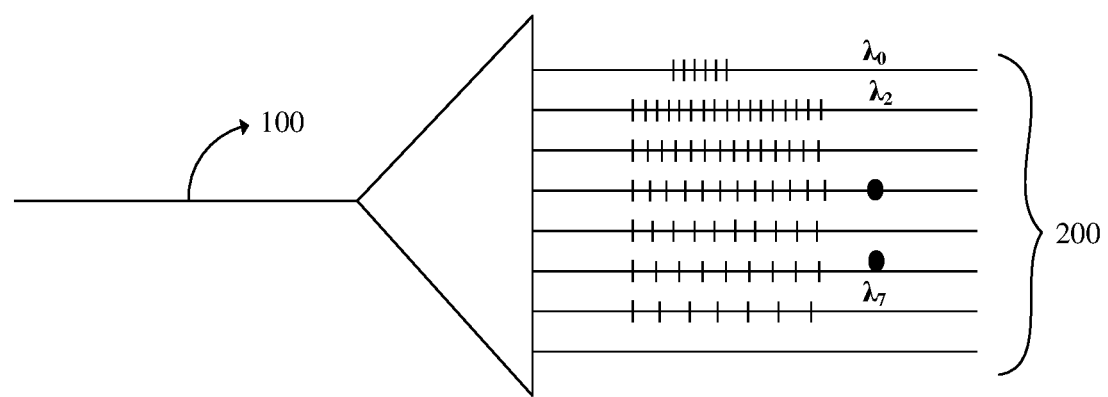
FIG. 16 is a schematic diagram of a structure of an even splitter in Scenario 10 according to an embodiment of the present invention.

Scenario 10: As shown in FIG. 16, only one special optical filter structure exists, in other words, the splitter includes only the first special optical filter structure or the second special optical filter structure, the first special optical filter structure or the second special optical filter structure is disposed on one of the eight optical branch sections, no optical filter structure is disposed on one of the eight optical branch sections, and common optical filter structures are disposed on the other six optical branch sections. In this scenario, a total of (N−2) (N−2=6) common wavelengths are required.

In comparison with Scenario 1, one special wavelength and two common wavelengths are reduced. Therefore, the first special wavelength may be set to $\lambda_0$=1623.5 nm, and the other six common wavelengths are $\lambda_2$=1625.5 nm, $\lambda_3$=1626 nm, $\lambda_4$=1626.5 nm, $\lambda_5$=1627 nm, $\lambda_6$=1627.5 nm, and $\lambda_7$=1628 nm. Alternatively, the second special wavelength is set to $\lambda_9$=1630 nm, and the other six common wavelengths are $\lambda_2$=1625.5 nm, $\lambda_3$=1626 nm, $\lambda_4$=1626.5 nm, $\lambda_5$=1627 nm, $\lambda_6$=1627.5 nm, and $\lambda_7$=1628 nm. In this way, only a wavelength range of 1628 nm−1623.5 nm=4.5 nm or 1630 nm−1625.5 nm=4.5 nm is required for designing a splitter with eight branch ports.

When the ambient temperature of the splitter changes, temperature drift directions and values of reflecting wavelengths of FBGs in a plurality of common optical filter structures located in the temperature drift consistency package are the same. If detected reflecting wavelengths corresponding to a reflection peak array are $\lambda_0$=1622.6 nm, $\lambda_1$=1625.1 nm, $\lambda_2$=1625.6 nm, $\lambda_3$=1626.1 nm, $\lambda_4$=1626.6 nm, $\lambda_5$=1627.1 nm, $\lambda_6$=1627.6 nm, $\lambda_7$=1628.1 nm, $\lambda_8$=1628.6 nm, and $\lambda_9$=1630.6 nm. It can be learned that a difference between common wavelengths remains unchanged. Therefore, a relationship between a wavelength and an optical branch section may be determined by observing a difference between wavelengths corresponding to reflection peaks.

Figure 17:
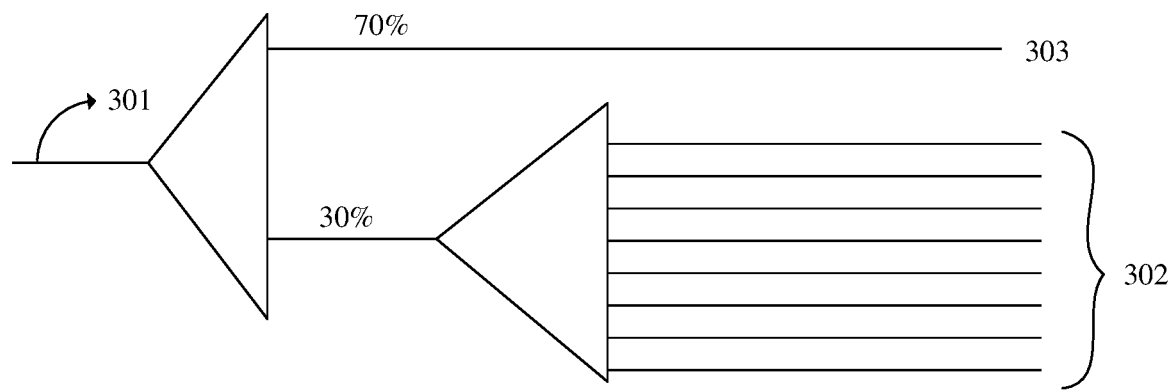
FIG. 17 is a schematic diagram of a structure of an uneven splitter according to an embodiment of the present invention.

In another embodiment, as shown in FIG. 17, the splitter is an uneven splitter 300. The uneven splitter includes one optical input section 301, N optical branch sections 302, and one bypass optical section 303. Power of optical signals output by the optical branch sections 302 is the same or substantially the same. Usually, the bypass optical section 303 is also referred to as a large-branching-ratio optical branch section. Power of an optical signal output by the bypass optical section 303 is different from or has a relatively large difference from power of an optical signal output by each optical branch section 302. Generally, the power of the optical signal output by the bypass optical section 303 is greater than the power of the optical signal output by each optical branch section 302. Correspondingly, the uneven splitter includes one uneven optical output fiber 321 and (N−1) even optical output fibers 321. The uneven splitter may be a PLC splitter, or may be an FBT splitter. Alternatively, the uneven splitter may be a splitter with a combination of a PLC and an FBT. For example, a 1:2 optical section may be implemented by using the FBT, and a 1:8 optical section may be implemented by using the PLC. A ratio of output optical power of two branch ends of the 1:2 optical section is 30%:70%, and the 30% branch end of the 1:2 optical section is connected to the 1:8 optical section. A manner of disposing the special optical filter structure and the common optical filter structure on the optical input section 301 and the N optical branch sections 302 may be the same as a manner of disposing the special optical filter structure and the common optical filter structure in Scenario 1 to Scenario 11. In addition, a bypass optical filter structure may be further disposed on the bypass optical section 303. A wavelength of the bypass optical filter structure may fall beyond the wavelength ranges used by the even splitter in Scenario 1 to Scenario 11. The bypass optical section is identified by using the wavelength of the bypass optical filter structure, and further, a stage to which the uneven splitter belongs in an ODN network may be identified by using the wavelength corresponding to the bypass optical section.

Figure 18:
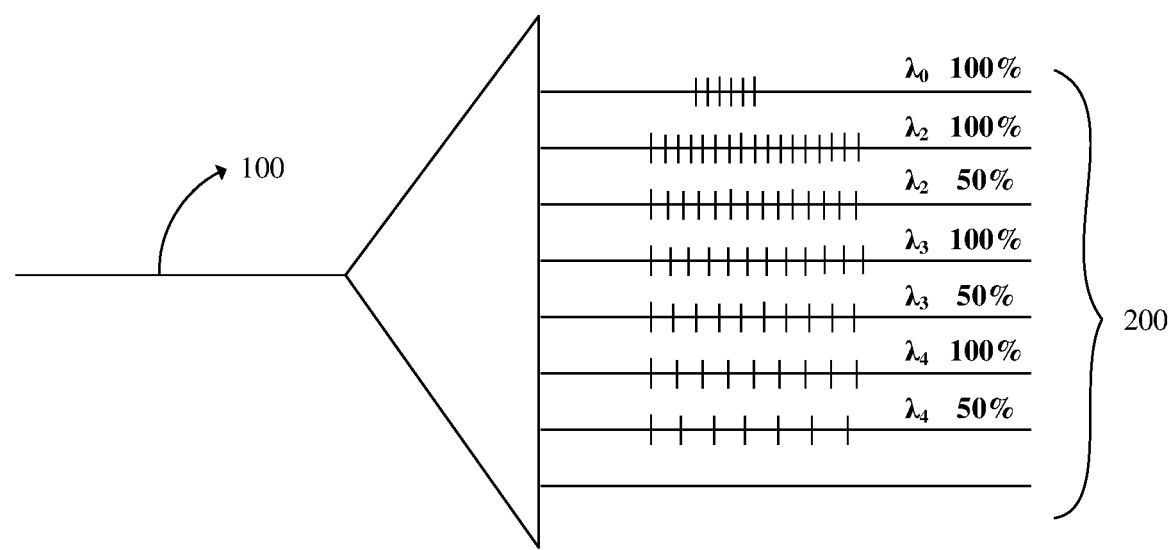
FIG. 18 is a schematic diagram of a structure of another splitter according to an embodiment of the present invention.

In another embodiment, as shown in FIG. 18, a splitter is further disclosed. The splitter includes an optical input section, N optical branch sections, and at least (N−1) optical filter structures. Each optical filter structure reflects an optical signal of one wavelength. The optical filter structure includes a special optical filter structure and at least (N−3) common optical filter structures, and in the at least (N−3) common optical filter structures, at least two common optical filter structures reflect optical signals of a same wavelength but have different reflectivities. The at least (N−3) common optical filter structures are disposed on at least (N−3) optical branch sections in a one-to-one correspondence, a wavelength of an optical signal reflected by each of the at least (N−3) common optical filter structures is a common wavelength, the special optical filter structure includes at least one of a first special optical filter structure and a second special optical filter structure, a wavelength of an optical signal reflected by the first special optical filter structure is a first special wavelength, and a wavelength of an optical signal reflected by the second special optical filter structure is a second special wavelength. Different wavelength values in at least (N−3) common wavelengths constitute an arithmetic sequence, a difference between the first special wavelength and a largest common wavelength is greater than a tolerance of the arithmetic sequence, and a difference between the second special wavelength and a smallest common wavelength is greater than the tolerance of the arithmetic sequence. For example, an optical filter structure 1 whose first special wavelength is set to $\lambda_0=1623.5$ nm is disposed on an optical branch section 1 of the splitter, an optical filter structure 2 whose wavelength is $\lambda_2=1625.5$ nm and whose reflectivity is 100% is disposed on an optical branch section 2 of the splitter, an optical filter structure 3 whose wavelength is $\lambda_2=1625.5$ nm and whose reflectivity is 50% is disposed on an optical branch section 3 of the splitter, an optical filter structure 4 whose wavelength is $\lambda_3=1626$ nm and whose reflectivity is 100% is disposed on an optical branch section 4 of the splitter, an optical filter structure 5 whose wavelength is $\lambda_3=1626$ nm and whose reflectivity is 50% is disposed on an optical branch section 5 of the splitter, an optical filter structure 6 whose wavelength is $\lambda_4=1626.5$ nm and whose reflectivity is 100% is disposed on an optical branch section 6 of the splitter, an optical filter structure 7 whose wavelength is $\lambda_4=1626.5$ nm and whose reflectivity is 50% is disposed on an optical branch section 7 of the splitter, and no optical filter structure is disposed on an optical branch section 8 of the splitter. In this way, only a wavelength range of 1625.5 nm–1623.5 nm=2 nm is required for a splitter with eight branch ports, so that occupation of wavelength resources can be further reduced.

Figure 19:
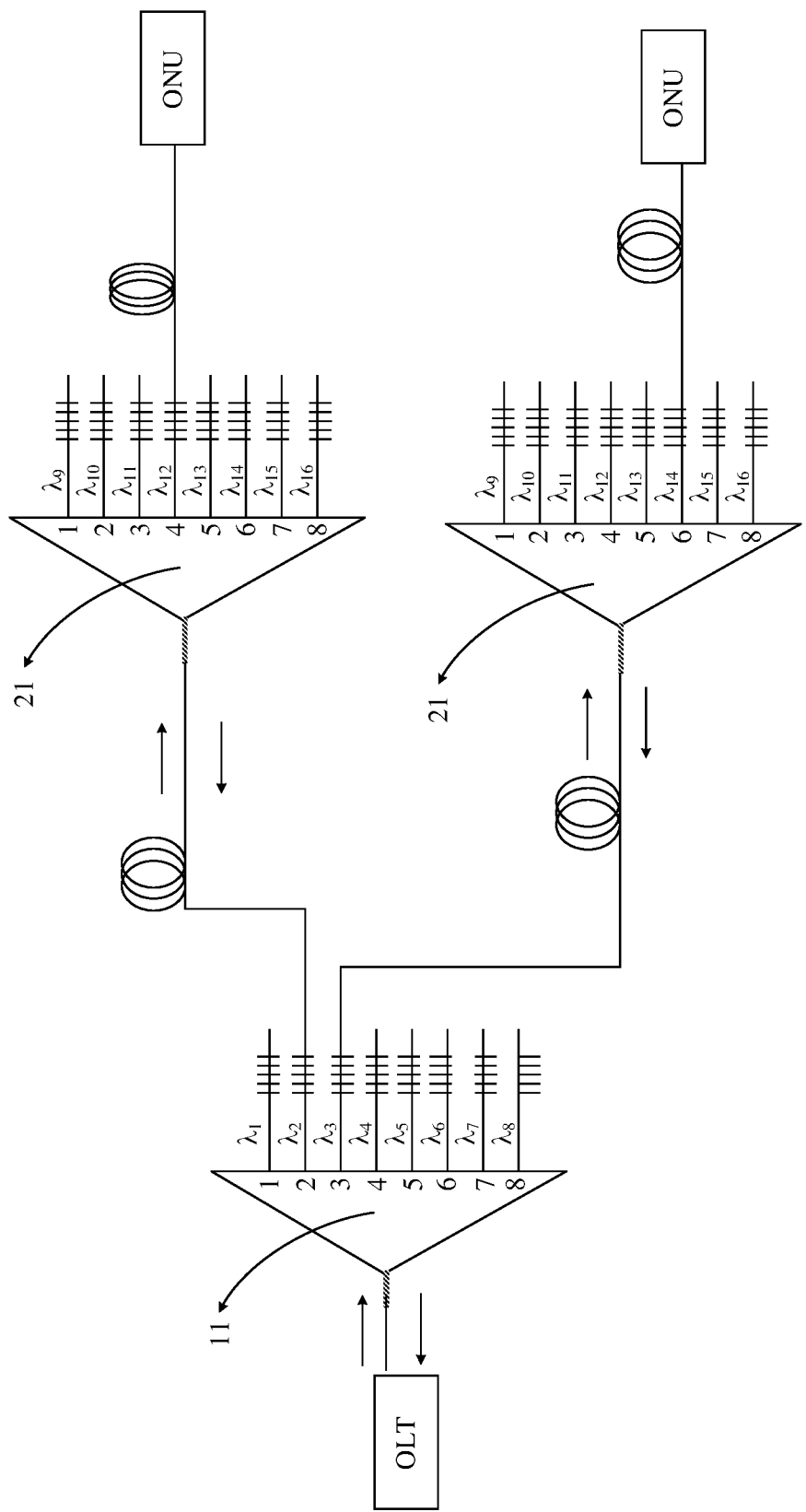
FIG. 19 is a schematic diagram of a structure of an optical distribution network according to an embodiment of the present invention.

In another embodiment, as shown in FIG. 19, an ODN network is further disclosed. The ODN network includes one first-stage splitter and a plurality of second-stage splitters. The first-stage splitter and the second-stage splitter each may be the splitter disclosed in any one of the foregoing embodiments. A difference between a largest value in wavelengths of optical signals reflected by an optical filter structure of the first-stage splitter and a smallest value in wavelengths of optical signals reflected by an optical filter structure of the second-stage splitter is greater than a tolerance of an arithmetic sequence.

Figure 20:
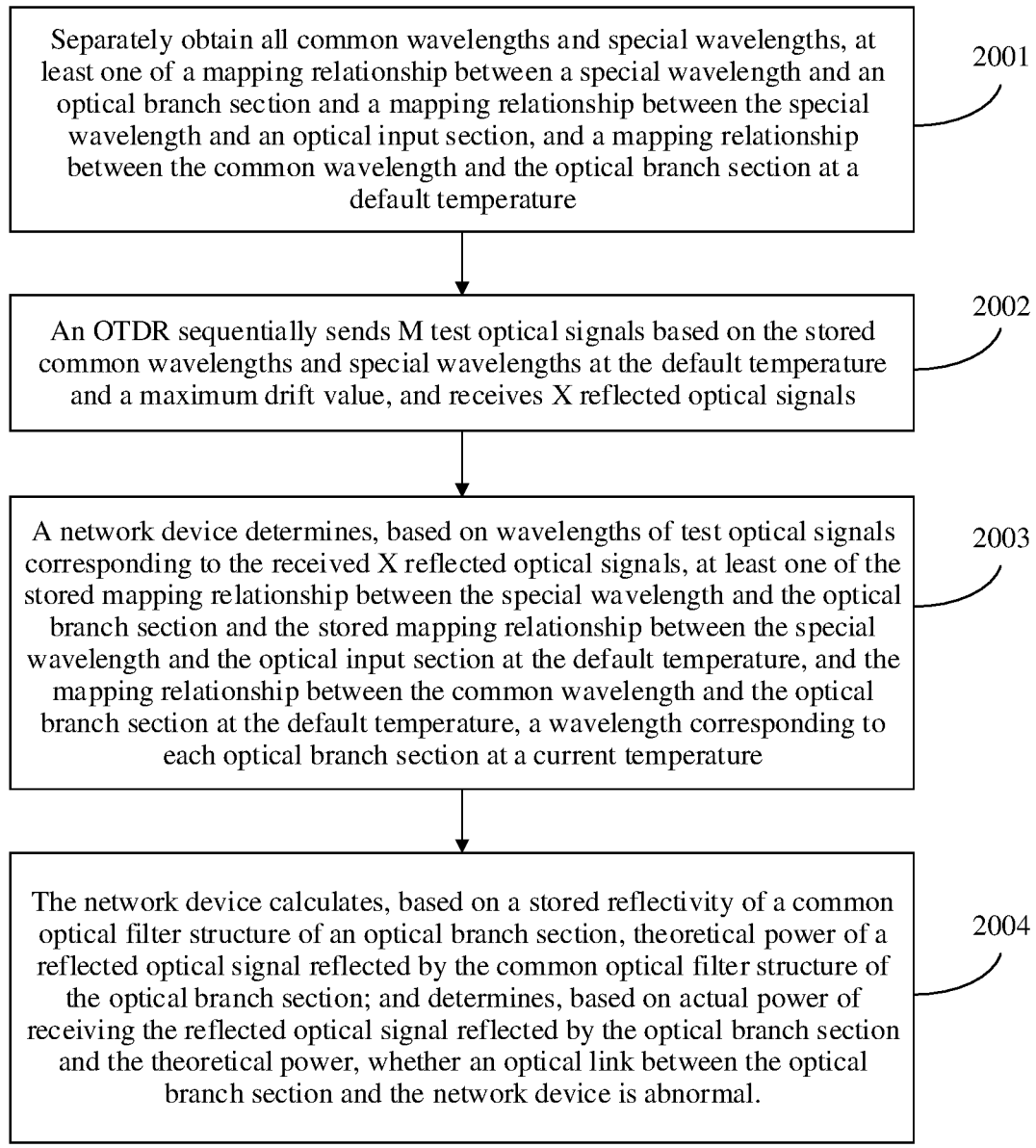
FIG. 20 is a schematic flowchart of a method for determining a wavelength corresponding to an optical filter structure included in a splitter according to an embodiment of the present invention.

It should be noted that based on the splitter in the foregoing embodiments, an embodiment of the present invention provides a method for determining a wavelength corresponding to an optical filter structure included in a splitter. As shown in FIG. 20, the method specifically includes the following steps.

2001: A network device separately obtains all common wavelengths and special wavelengths, at least one of a mapping relationship between the special wavelength and an optical branch section and a mapping relationship between the special wavelength and an optical input section, and a mapping relationship between the common wavelength and the optical branch section at a default temperature. The common wavelength is a wavelength of an optical signal reflected by a common optical filter structure, and the special wavelength is a wavelength of an optical signal reflected by a special optical filter structure. The network device may be specifically an OLT, an OTDR, or a network device into which an OTDR and an OLT are integrated.

When a splitter is designed, special wavelengths and common wavelengths of the splitter and a mapping relationship between the common wavelength and an optical branch section are stored. In some cases, a mapping relationship between the special wavelength and the optical branch section is further recorded. The common wavelength and the special wavelength may drift as a temperature changes. For example, at the default temperature (for example, 20 degrees Celsius), a wavelength of a common optical filter structure disposed on an optical branch section 1 is $\lambda_1=1625$ nm, that is, when the optical branch section 1 receives an optical signal that is of the wavelength 1625 nm and that is sent by a central office device, the common optical filter structure of the optical branch section 1 reflects the optical signal of the wavelength. However, when the ambient temperature changes to 80 degrees Celsius, and the common optical filter structure of the optical branch section 1 receives the optical signal of the wavelength 1625 nm from the central office device, the common optical filter structure does not reflect the optical signal of the wavelength. When the common optical filter structure of the optical branch section 1 receives an optical signal that is of a wavelength 1625.4 nm and that is sent by the central office device, the common optical filter structure reflects the optical signal of the wavelength. That is, when the ambient temperature is 80 degrees Celsius, the wavelength of the common optical filter structure disposed on the optical branch section 1 changes to $\lambda_1=1625.4$ nm.

2002: The network device sequentially sends M test optical signals based on the stored common wavelengths and special wavelengths at the default temperature and a maximum drift value, and receives X reflected optical signals. X is less than M, X and M are natural numbers, a wavelength of the test optical signal falls within a range between a drift difference and a drift sum, the drift difference is a smallest value in the common wavelengths and the special wavelengths at the default temperature minus the maximum drift value, the drift sum is a largest value in the common wavelengths and the special wavelengths at the default temperature plus the maximum drift value, and the reflected optical signal is reflected when the test optical signal encounters an optical filter structure of the splitter.

If a first special wavelength exists, the largest value in the common wavelengths and the special wavelengths is the first special wavelength; or if a first special wavelength does not exist, the largest value in the common wavelengths and the special wavelengths is a largest value in the common wavelengths. If a second special wavelength exists, the smallest value in the common wavelengths and the special wavelengths is the second special wavelength; or if a second special wavelength does not exist, the smallest value in the common wavelengths and the special wavelengths is a smallest value in the common wavelengths. The maximum drift value may be preset. Generally, a wavelength may drift by ±1 nm, and therefore the maximum drift value may be 1 nm. In this way, a wavelength range of the test optical signals can be determined. To be specific, a smallest wavelength of the test optical signals is the smallest value in the common wavelengths and the special wavelengths at the default temperature minus the maximum drift value, and a largest wavelength of the test optical signals is the largest value in the common wavelengths and the special wavelengths at the default temperature minus the maximum drift value. The M test optical signals may be sent in two manners.

Manner 1: In a range between the smallest wavelength and the largest wavelength of the test optical signals, the network device performs scanning by using the test optical signals at an interval of a specific step (for example, 0.01 nm), in other words, a wavelength difference between adjacent test optical signals that are consecutively sent is 0.01 nm. The following uses an example in which both the first special wavelength and the second special wavelength exist to describe the process in detail: When the first special wavelength $\lambda_9$=1630.5 nm at the default temperature and the second special wavelength $\lambda_0$=1623 nm at the default temperature are obtained, and the maximum drift value is 1 nm, scanning is performed from a wavelength 1622 nm to a wavelength 1631.5 nm based on a step of 0.01 nm. That is, the network device sequentially sends test optical signals of a plurality of wavelengths to the splitter. The test optical signals are sent by increasing from the wavelength 1622 nm to the wavelength 1631.5 nm based on the tolerance 0.01 nm. In other words, the network device sends a test optical signal from the wavelength 1622 nm to the wavelength 1631.5 nm at an interval of 0.01 nm. For another example, if the network device receives a reflected optical signal when sending a test optical signal of a wavelength 1622.5 nm, a wavelength of a test optical signal corresponding to the reflected optical signal is 1622.5 nm.

It should be noted that the network device may send the test optical signals starting from a test optical signal of the smallest wavelength, until a test optical signal of the largest wavelength is sent. The network device may alternatively send the test optical signals starting from a test optical signal of the largest wavelength, until a test optical signal of the smallest wavelength is sent.

Manner 2: In a range between the smallest wavelength and the largest wavelength of the test optical signals, the network device may send a plurality of test optical signals starting from a test optical signal of the smallest wavelength at an interval of a specific step (for example, 0.01 nm). After receiving a reflected signal the first time, the network device determines that a wavelength of a test optical signal corresponding to the reflected signal is the smallest wavelength in the common wavelengths and the special wavelengths, then obtains, from values of the stored common wavelengths and special wavelengths at the default temperature, a tolerance of an arithmetic sequence including the common wavelengths, and sends a test optical signal based on a wavelength obtained by adding the tolerance and the wavelength of the test optical signal corresponding to the reflected optical signal received the first time. By analogy, the network device sequentially sends one test optical signal at an interval of the tolerance, in other words, a wavelength difference between adjacent test optical signals is the tolerance. In this way, a quantity of sent test optical signals can be reduced.

2003: The network device determines, based on wavelengths of test optical signals corresponding to the received X reflected optical signals, at least one of the stored mapping relationship between the special wavelength and the optical branch section and the stored mapping relationship between the special wavelength and the optical input section at the default temperature, and the mapping relationship between the common wavelength and the optical branch section at the default temperature, a wavelength corresponding to each optical branch section at a current temperature.

Values of common wavelengths and special wavelengths at the current ambient temperature may be determined based on a sequence of values of the wavelengths of the test optical signals corresponding to the received reflected optical signals and a sequence of values of the common wavelengths and the special wavelengths, and the wavelength corresponding to each optical branch section at the current ambient temperature may be determined based on at least one of the stored mapping relationship between the special wavelength and the optical branch section and the stored mapping relationship between the special wavelength and the optical input section at the default temperature and the mapping relationship between the common wavelength and the optical branch section at the default temperature.

For example, if the wavelength of the test optical signal corresponding to the reflected optical signal received by the network device the first time is a smallest value in the common wavelengths and the special wavelengths at the current temperature, a wavelength of a test optical signal corresponding to a reflected optical signal received by the network device the last time is a largest value in the common wavelengths and the special wavelengths at the current temperature, and both the first special wavelength and the second special wavelength exist, the wavelength of the test optical signal corresponding to the reflected optical signal received the first time is the second special wavelength, a wavelength of a test optical signal corresponding to a reflected optical signal received the second time is the first common wavelength, and by analogy, the wavelength of the test optical signal corresponding to the reflected optical signal received the last time is the first special wavelength. Then the network device determines, based on at least one of the mapping relationship between the special wavelength and the optical branch section and the mapping relationship between the special wavelength and the optical input section at the default temperature and the mapping relationship between the common wavelength and the optical branch section at the default temperature, the wavelength corresponding to each optical branch section at the current ambient temperature. For example, if the second special wavelength is set on the optical branch section 1, at the current temperature, a wavelength corresponding to the optical branch section 1 is the wavelength of the test optical signal corresponding to the reflected optical signal received the first time. A wavelength corresponding to an optical branch section is a wavelength of an optical signal filtered out (or reflected) by an optical filter structure disposed on the optical branch section. This optical filter structure may be a special optical filter structure or a common optical filter structure. In this way, the wavelength corresponding to each optical branch section at the current temperature can be obtained.

2004: The network device calculates, based on a stored reflectivity of a common optical filter structure of an optical branch section, theoretical power of a reflected optical signal reflected by the common optical filter structure of the optical branch section; and determines, based on actual power of receiving the reflected optical signal reflected by the optical branch section and the theoretical power, whether an optical link between the optical branch section and the network device is abnormal.

If the network device stores a reflectivity, for example, 50%, of a common optical filter structure disposed on an optical branch section, theoretical power of a reflected optical signal reflected by the common optical filter structure of the optical branch section may be calculated, that is, the theoretical power is 50% of power of a tested optical signal. Actual power of the actually received reflected optical signal is measured. If a difference between the theoretical power and the actual power is less than or equal to a specific threshold, it indicates that an optical link between the optical branch section and the network device is normal; or if a difference between the theoretical power and the actual power exceeds the threshold, it indicates that an optical link between the optical branch section and the network device is abnormal.

It should be noted that because all common optical filter structures or all common optical filter structures and special optical filter structures are located in a temperature drift consistency package, common wavelengths or special wavelengths synchronously change although the ambient temperature changes, and therefore a value relationship between the common wavelengths and the special wavelengths does not change at the default temperature and the changed ambient temperature.

Figure 21:
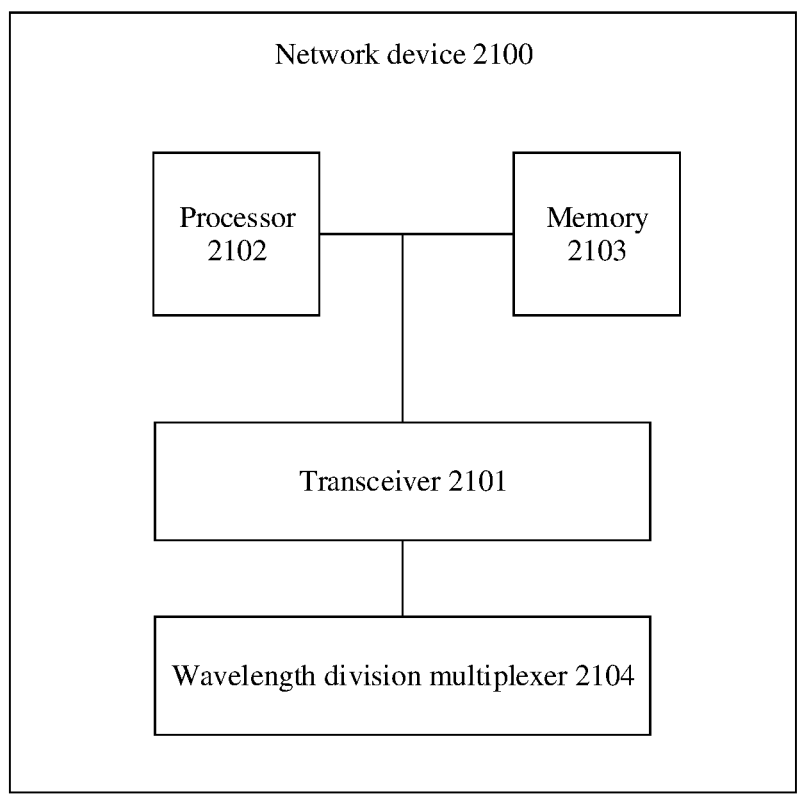
FIG. 21 is a schematic diagram of a structure of a network device according to an embodiment of the present invention.

As shown in FIG. 21, the present invention further provides a network device 2100 described in the foregoing embodiments. The network device 2100 may be specifically an OLT, an OTDR, or a network device into which an OTDR and an OLT are integrated. The network device 2100 includes a transceiver 2101 and a processor 2102.

The transceiver 2101 includes an optical transmitter and an optical receiver. The optical transmitter converts an electrical signal into an optical signal, and sends the optical signal to an ODN. The optical receiver receives an optical signal from the ODN network, and converts the optical signal into an electrical signal. The optical transmitter may be implemented by using a light-emitting component, for example, a gas laser, a solid laser, a liquid laser, a semiconductor laser, or a direct modulated laser. The optical receiver may be implemented by using an optical detector, for example, a photodetector or a photodiode (for example, an avalanche photodiode).

The transceiver 2101 may be an optical module. The optical module may further include a control circuit. The optical transmitter has a wavelength tunable function, and may be a distributed Bragg reflector (DBR) laser, may be obtained by combining a group of distributed feedback Bragg (DFB) lasers, or may be in another form. The optical module may include one optical transmitter, and the optical transmitter may send both a service wavelength and a test wavelength.

Alternatively, the optical module may include two optical transmitters, one optical transmitter is configured to send service light, and the other optical transmitter is configured to send test light.

The processor 2102 is configured to implement functions such as ONU management, DBA (dynamic bandwidth allocation), ONU registration, and data receiving/transmission. The processor 2102 may be implemented by using a hardware circuit, a software program, or a combination of hardware and software, for example, a field-programmable gate array (FPGA), an application-specific integrated circuit (ASIC), a system on chip (SoC), media access control (MAC) chip, a central processing Unit (CPU), a network processor (NP), a digital signal processor (DSP), a micro controller unit (MCU), or a programmable logic device (PLD), or another integrated chip. The processor 2102 may perform, for example, the foregoing determining of a transmittance, the foregoing determining of a reference receiving power value P0, and the foregoing determining of an optical link.

The network device 2100 further includes a memory 2103, and the memory 2103 may be a read-only memory (ROM), a static storage device, a dynamic storage device, or a random access memory (RAM), may be a register, or may be a non-volatile memory such as a flash, or at least one disk memory. When the technical solutions provided in embodiments of the present invention are implemented by using software or firmware, program code used to implement the technical solutions provided in embodiments of the present invention is stored in the memory 2103, and is executed by the processor 2102.

The memory 2103 and the processor 2102 may be separately located on different physical entities, or may be partially or completely integrated into one physical entity. The physical entity may be a field-programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip.

The network device 2100 further includes a wavelength division multiplexer 2104. The wavelength division multiplexer is connected to the transceiver 2101. When the network device 2100 sends an optical signal, the wavelength division multiplexer serves as a multiplexer. When the network device 2100 receives an optical signal, the wavelength division multiplexer serves as a demultiplexer. The wavelength division multiplexer may also be referred to as an optical coupler.

It may be understood that the wavelength division multiplexer 2104 may alternatively exist independently of the network device 2100.

Based on the foregoing embodiments, the network device 2100 shown in FIG. 21 performs the steps 2001 to 2004 in the embodiment shown in FIG. 20. Specifically, the transceiver 2101 performs step 2002. The processor 2102 performs the steps 2001, 2003, and 2004. For more details of performing the foregoing steps by the processor 2102 and the transceiver 2101, refer to the foregoing method embodiments and related descriptions of the accompanying drawings. Details are not described herein again. Similarly, the network device 2100 has corresponding beneficial effects in the foregoing method embodiments, and details are not described herein again.

It may be understood that the network device 2100 described above may further include another component, and details are not described herein.

The present invention further provides a PON system. The PON system includes the network device 2100 described in the foregoing embodiment and an ODN. For details, refer to the foregoing embodiments, and details are not described herein again. Similarly, the PON system has corresponding beneficial effects in the foregoing embodiments, and details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The available medium may be a magnetic medium (for example, a floppy disk, a hard disk, or a magnetic tape), an optical medium (for example, a DVD), a semiconductor medium (for example, a solid state disk (SSD)), or the like.

To sum up, the foregoing descriptions are merely embodiments of the present invention, but are not intended to limit the protection scope of the present invention. Any modification, equivalent replacement, or improvement made without departing from the spirit and principle of the present invention shall fall within the protection scope of the present invention.

What is claimed is:

1. A splitter, comprising:
an optical input;
N optical branches; and
at least (N−1) optical filters, wherein each optical filter of the at least (N−1) optical filters reflects an optical signal of one corresponding wavelength, N is an integer greater than or equal to 4, the at least (N−1) optical filters comprise a non-common optical filter and at least (N−3) common optical filters, the at least (N−3) common optical filters are disposed on at least (N−3) optical branches in a one-to-one correspondence, and a wavelength of an optical signal reflected by each of the at least (N−3) common optical filters is a common wavelength; and
wherein the non-common optical filter comprises at least one of a first non-common optical filter or a second non-common optical filter, a wavelength of an optical signal reflected by the first non-common optical filter is a first non-common wavelength, a wavelength of an optical signal reflected by the second non-common optical filter is a second non-common wavelength, at least (N−3) common wavelengths are in an arithmetic sequence, a difference between the first non-common wavelength and a largest common wavelength is greater than a tolerance of the arithmetic sequence, and a difference between the second non-common wavelength and a smallest common wavelength is greater than the tolerance of the arithmetic sequence.

2. The splitter according to claim 1, wherein the splitter comprises the first non-common optical filter and the second non-common optical filter, and wherein:
both the first non-common optical filter and the second non-common optical filter are disposed on the optical input, and a quantity of the at least (N−3) optical branches is (N−1) or N;
the first non-common optical filter and the second non-common optical filter are disposed on two optical branches, wherein the two optical branches do not belong to the at least (N−3) optical branches, and a quantity of the at least (N−3) optical branches is (N−3) or (N−2); or
one of the first non-common optical filter or the second non-common optical filter is disposed on the optical input, and the other of the first non-common optical filter and the second non-common optical filter is disposed on one optical branch, wherein the one optical branch does not belong to the at least (N−3) optical branches, and a quantity of the at least (N−3) optical branches is (N−2) or (N−1).

3. The splitter according to claim 1, wherein the splitter comprises only the first non-common optical filter or only the second non-common optical filter, and wherein:
the first non-common optical filter or the second non-common optical filter is disposed on the optical input, wherein a quantity of the at least (N−3) optical branches is (N−1) or N; or
the first non-common optical filter or the second non-common optical filter is disposed on one optical branch, wherein the one optical branch does not belong to the at least (N−3) optical branches, and a quantity of the at least (N−3) optical branches is (N−2) or (N−1).

4. The splitter according to claim 1, wherein the splitter is an even splitter or an uneven splitter.

5. The splitter according to claim 4, wherein the splitter is an uneven splitter, and the uneven splitter further comprises one bypass optical output, an optical filter disposed on the bypass optical output reflects an optical signal of one bypass wavelength at a specific reflectivity, and the one bypass wavelength is different from any one of the common wavelength, the first non-common wavelength, and the second non-common wavelength.

6. The splitter according to claim 1, wherein:
the splitter is planar lightwave circuit (PLC) splitter, and the PLC splitter comprises an optical input fiber, N optical output fibers, and a planar lightwave circuit;
the planar lightwave circuit comprises an optical input waveguide, N optical output waveguides, and an intermediate branch waveguide connected between the optical input waveguide and the N optical output waveguides;
the optical input fiber is connected to the optical input waveguide, and the optical input comprises the optical input fiber and the optical input waveguide;

the N optical output fibers are connected to the N optical output waveguides in a one-to-one correspondence; and each of the optical branches comprises the intermediate branch waveguide and a pair comprising one optical output waveguide and one optical output fiber that are connected to each other.

7. The splitter according to claim 6, wherein a first optical filter of the at least (N−1) optical filters is disposed on at least one of the intermediate branch waveguide, the optical output waveguide, or the optical output fiber.

8. The splitter according to claim 7, wherein the optical output fiber comprises a ribbon fiber, and the first optical filter of the at least (N−1) optical filters is disposed on the ribbon fiber.

9. The splitter according to claim 1, wherein the splitter is a fused biconical taper splitter, the fused biconical taper splitter comprises an optical input fiber, a coupling area fiber, and N optical output fibers, and a first optical filter of the at least (N−1) optical filters is disposed on the N optical output fibers.

10. The splitter according to claim 1, further comprising a temperature drift consistency package, wherein the temperature drift consistency package is configured to:
when an ambient temperature changes, make a temperature inside the temperature drift consistency package be uniformly distributed; and
wherein the at least (N−1) optical filters are packaged and fastened inside the temperature drift consistency package, or the at least (N−3) common optical filters are packaged and fastened inside the temperature drift consistency package.

11. A splitter, comprising:
an optical input;
N optical branches; and
at least (N−1) optical filters, wherein each optical filter of the at least (N−1) optical filters reflects an optical signal of one corresponding wavelength, the at least (N−1) optical filters comprise a non-common optical filter and at least (N−3) common optical filters, and in the at least (N−3) common optical filters, at least two common optical filters reflect optical signals of a same wavelength but have different reflectivities; and
wherein the at least (N−3) common optical filters are disposed on at least (N−3) optical branches in a one-to-one correspondence, a wavelength of an optical signal reflected by each of the at least (N−3) common optical filters is a common wavelength, the non-common optical filter comprises at least one of a first non-common optical filter and a second non-common optical filter, a wavelength of an optical signal reflected by the first non-common optical filter is a first non-common wavelength, and a wavelength of an optical signal reflected by the second non-common optical filter is a second non-common wavelength, wherein different wavelength values in at least (N−3) common wavelengths are an arithmetic sequence, a difference between the first non-common wavelength and a largest common wavelength is greater than a tolerance of the arithmetic sequence, and a difference between the second non-common wavelength and a smallest common wavelength is greater than the tolerance of the arithmetic sequence.

12. The splitter according to claim 11, wherein the splitter comprises the first non-common optical filter and the second non-common optical filter, and wherein:

both the first non-common optical filter and the second non-common optical filter are disposed on the optical input, and a quantity of the at least (N−3) optical branches is (N−1) or N;
the first non-common optical filter and the second non-common optical filter are disposed on two optical branches, wherein the two optical branches do not belong to the at least (N−3) optical branches, and a quantity of the at least (N−3) optical branches is (N−3) or (N−2); or
one of the first non-common optical filter or the second non-common optical filter is disposed on the optical input, and the other of the first non-common optical filter and the second non-common optical filter is disposed on one optical branch, wherein the one optical branch does not belong to the at least (N−3) optical branches, and a quantity of the at least (N−3) optical branches is (N−2) or (N−1).

13. The splitter according to claim 11, wherein the splitter comprises only the first non-common optical filter or only the second non-common optical filter, and wherein:
the first non-common optical filter or the second non-common optical filter is disposed on the optical input, and wherein a quantity of the at least (N−3) optical branches is (N−1) or N; or
the first non-common optical filter or the second non-common optical filter is disposed on one optical branch, wherein the one optical branch does not belong to the at least (N−3) optical branches, and a quantity of the at least (N−3) optical branches is (N−2) or (N−1).

14. The splitter according to claim 11, wherein the splitter is an even splitter or an uneven splitter.

15. The splitter according to claim 14, wherein when the splitter is an uneven splitter, the uneven splitter further comprises one bypass optical output, a first optical filter of the at least (N−1) optical filters disposed on the bypass optical output reflects an optical signal of one bypass wavelength at a specific reflectivity, and the bypass wavelength is different from any one of the common wavelength, the first non-common wavelength, and the second non-common wavelength.

16. The splitter according to claim 11, further comprising:
a temperature drift consistency package, wherein the temperature drift consistency package is configured to:
when an ambient temperature changes, make a temperature inside the temperature drift consistency package be uniformly distributed; and
wherein the at least (N−1) optical filters are packaged and fastened inside the temperature drift consistency package, or the at least (N−3) common optical filters are packaged and fastened inside the temperature drift consistency package.

17. A method, comprising:
sequentially sending M test optical signals based on stored common wavelengths and non-common wavelengths at a default temperature and a maximum drift value, and receiving X reflected optical signals, wherein X is less than M, X and M are natural numbers, each reflected optical signal is reflected when a corresponding test optical signal encounters an optical filter of a splitter, a wavelength of each test optical signal falls within a range between a drift difference and a drift sum, the drift difference is a smallest value in the common wavelengths and the non-common wavelengths at the default temperature minus the maximum drift value, the drift sum is a largest value in the common wavelengths and the non-common wavelengths at the default temperature plus the maximum drift value, each common wavelength is a wavelength of an optical signal reflected by a common optical filter, and each non-common wavelength is a wavelength of an optical signal reflected by a non-common optical filter; and determining, based on wavelengths of test optical signals corresponding to the received X reflected optical signals, at least one of a stored mapping relationship between a non-common wavelength and a corresponding optical branch, a stored mapping relationship between a non-common wavelength and an optical input, at the default temperature, or a mapping relationship between the common wavelength and the optical branch at the default temperature and a wavelength corresponding to each optical branch at a current temperature.

18. The method according to claim 17, wherein sequentially sending the M test optical signals comprises:

sending a test optical signal at an interval of a fixed step within the range between the drift difference and the drift sum.

19. The method according to claim 17, wherein sequentially sending the M test optical signals comprises:

sending a test optical signal at an interval of a fixed step within the range between the drift difference and the drift sum, and after a first reflected optical signal is received, sending a test optical signal at an interval of a tolerance by using a wavelength of a test optical signal corresponding to the first reflected signal as a reference, wherein the fixed step is less than the tolerance, and the tolerance is a tolerance of an arithmetic sequence formed by all common wavelengths at the default temperature.

20. The method according to claim 17, wherein after determining the wavelength corresponding to each optical branch at a current temperature, the method further comprises:

calculating, based on a stored reflectivity of a common optical filter of an optical branch section, theoretical power of a reflected optical signal reflected by the common optical filter of the optical branch section; and determining, based on actual power of receiving the reflected optical signal reflected by the optical branch section and the theoretical power, whether an optical link between the optical branch section and a network device is abnormal.

* * * * *